(12) United States Patent
Lee et al.

(10) Patent No.: US 8,612,050 B2
(45) Date of Patent: Dec. 17, 2013

(54) INTELLIGENT PRODUCT FEED SYSTEM AND METHOD

(75) Inventors: Lawrence Lee, Menlo Park, CA (US); Minh Do, Mountain View, CA (US); Rong Zhou, Cupertino, CA (US); Frederick Lidington, Charlotte, NC (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1372 days.

(21) Appl. No.: 12/181,693

(22) Filed: Jul. 29, 2008

(65) Prior Publication Data

US 2010/0030373 A1 Feb. 4, 2010

(51) Int. Cl.
*B65G 47/24* (2006.01)

(52) U.S. Cl.
USPC ..... 700/223; 198/460.2; 198/411; 198/461.2; 198/460.1; 700/226; 700/230

(58) Field of Classification Search
USPC .......................... 700/218, 219, 223, 228, 230; 198/459.8, 461.1, 461.2, 575–577
See application file for complete search history.

(56) References Cited

U.S. PATENT DOCUMENTS

| | | | | |
|---|---|---|---|---|
| 4,038,531 A * | 7/1977 | Loe, Jr. | ...................... | 700/112 |
| 4,881,635 A * | 11/1989 | Raschke | .................... | 198/460.2 |
| 5,241,534 A * | 8/1993 | Omuro et al. | ................. | 370/218 |
| 5,660,262 A * | 8/1997 | Landrum et al. | .............. | 198/411 |
| 5,762,175 A * | 6/1998 | Focke et al. | ................ | 198/461.2 |
| 5,903,341 A * | 5/1999 | Perry et al. | ................. | 356/237.1 |
| 6,215,205 B1 * | 4/2001 | Banas et al. | ................ | 310/12.11 |
| 6,263,277 B1 * | 7/2001 | Tanimoto et al. | ............. | 701/533 |
| 6,315,513 B1 * | 11/2001 | Harukawa et al. | ............ | 414/286 |
| 6,540,063 B1 * | 4/2003 | Fallas et al. | ................ | 198/461.1 |
| 6,694,220 B1 * | 2/2004 | Tanz | ............................ | 700/226 |
| 6,764,267 B2 | 7/2004 | Hart et al. | | |
| 6,848,933 B1 * | 2/2005 | Delaney et al. | ............... | 439/392 |
| 6,898,475 B1 | 5/2005 | Ruml et al. | | |
| 6,920,369 B2 * | 7/2005 | Ueno et al. | .................... | 700/121 |
| 7,043,321 B2 | 5/2006 | Ruml et al. | | |
| 7,139,629 B2 | 11/2006 | Fromherz et al. | | |

(Continued)

FOREIGN PATENT DOCUMENTS

| | | |
|---|---|---|
| DE | 36 30 791 C1 | 9/1986 |
| EP | 0 802 131 A1 | 10/1997 |
| JP | 09040171 A | 2/1997 |

OTHER PUBLICATIONS

Roberto Cervoni, Amedeo Cesta, and Angelo Oddi, "Managing Dynamic Temporal Constraint Networks", National Research Council of Italy, Rome, Italy, Proceedings of the $2^{nd}$ Int. Conference on Artificial Intelligence Planning Systems (AIPS-94), 1994.

(Continued)

*Primary Examiner* — Gene Crawford
*Assistant Examiner* — Kyle Logan
(74) *Attorney, Agent, or Firm* — Fay Sharpe LLP

(57) ABSTRACT

Intelligent product feed systems and product transport methods are presented in which an array of variable speed transport modules is positioned between an input transport mechanism and an output mechanism, with the individual module speeds being controlled by a model-based planner to transport products delivered in an uncertain fashion by the input transport mechanism to the output mechanism synchronized and oriented according to a specified product configuration.

27 Claims, 19 Drawing Sheets

(56) References Cited

U.S. PATENT DOCUMENTS

| | | | |
|---|---|---|---|
| 7,222,738 B1 * | 5/2007 | Stockard | 209/552 |
| 7,230,736 B2 | 6/2007 | Fromherz | |
| 7,233,840 B2 * | 6/2007 | Schiesser et al. | 700/230 |
| 7,302,787 B2 * | 12/2007 | Iwasa et al. | 53/504 |
| 7,512,455 B2 | 3/2009 | Fromherz | |
| 2002/0134710 A1 * | 9/2002 | Nagler | 209/509 |
| 2004/0008820 A1 | 1/2004 | Schmitt | |
| 2004/0020746 A1 * | 2/2004 | Tweedy et al. | 198/377.01 |
| 2004/0065526 A1 * | 4/2004 | Zeitler | 198/460.1 |
| 2004/0176874 A1 * | 9/2004 | Kvisgaard et al. | 700/240 |
| 2005/0241910 A1 | 11/2005 | Affaticati et al. | |
| 2005/0273299 A1 * | 12/2005 | Toyosawa et al. | 703/7 |
| 2007/0088487 A1 * | 4/2007 | Lahti et al. | 701/104 |
| 2008/0027590 A1 * | 1/2008 | Phillips et al. | 701/2 |
| 2008/0082205 A1 * | 4/2008 | Park et al. | 700/223 |
| 2008/0082206 A1 * | 4/2008 | Egami et al. | 700/230 |
| 2008/0148257 A1 | 6/2008 | Ruml et al. | |
| 2009/0089031 A1 * | 4/2009 | Sturrock et al. | 703/7 |
| 2010/0228386 A1 * | 9/2010 | Kharkover | 700/218 |

OTHER PUBLICATIONS

Peter E. Hart, Nils J. Nilsson, and Bertram Raphael, "A Formal Basis for the Heuristic Determination of Minimum Cost Paths", IEEE Transactions of Systems Science and Cybernetics, vol. SSC-4, No. 2 Jul. 1968.

Rina Dechter and Judea Pearl, "Generalized Best-First Search Strategies and the Optimality of A"., University of California, Los Angeles, California, Journal of the Association for Computing Machinery, vol. 32, No. 3, Jul. 1985, pp. 505-536.

European Search Report, EP 09 16 6069, Mar. 23, 2012.

EP Official Communication dated Nov. 27, 2012 for Appl. No. 09 166 069.6, pp. 1-3.

* cited by examiner

INTELLIGENT PRODUCT FEED SYSTEM AND METHOD

REFERENCE TO RELATED APPLICATIONS

U.S. Pat. No. 7,230,736, filed Oct. 30, 2002, entitled PLANNING AND SCHEDULING RECONFIGURABLE SYSTEMS WITH ALTERNATIVE CAPABILITIES; U.S. Pat. No. 7,139,629, filed Apr. 28, 2003, entitled PLANNING AND SCHEDULING FOR FAILURE RECOVERY SYSTEM AND METHOD; U.S. Pat. No. 7,043,321, filed May 27, 2004, entitled EXCEPTION HANDLING IN MANUFACTURING SYSTEMS COMBINING ON-LINE PLANNING AND PREDETERMINED RULES; U.S. Pat. No. 6,898,475, filed May 27, 2004, entitled SYSTEM AND METHOD UTILIZING TEMPORAL CONSTRAINTS TO COORDINATE MULTIPLE PLANNING SESSIONS; U.S. Pat. Appln. Pub. No. 20080148257A1, filed Dec. 19, 2006, entitled EXCEPTION HANDLING; and U.S. Pat. Appln. Pub. No. 20040088207A1, filed Oct. 30, 2002, entitled Planning and SCHEDULING RECONFIGURABLE SYSTEMS AROUND OFF-LINE RESOURCES are hereby incorporated by reference in their entireties as if fully set forth herein.

BACKGROUND

The present exemplary embodiments relate to automated product feed systems that carry products from an input mechanism to an output mechanism. These systems are conventionally employed in manufacturing and packaging of various products, such as food items that must be conveyed from an oven or other production machine to a wrapping or packaging apparatus. In these applications, the products are often provided by the production machine in an uncertain fashion, with products arriving at the exit of the production machine in no particular order or relative orientation. The finished products must be conveyed for wrapping or packaging in groups by an output mechanism that requires the products to be supplied in a predetermined arrangement. In the past, this has been accomplished by mechanical and human positioning at the entrance to the product wrapping/packaging machinery to avoid jamming or other machine failures associated with misaligned products. These systems are typically configured in a cross-feed arrangement with the products being moved in rows from a first conveyor belt to a second conveyor that feeds the packaging or wrapping machine, with the conveyors moving at right angles to one another, an example of which is shown in U.S. Pat. No. 6,764,267, the entirety of which is hereby incorporated by reference. These cross-feed configurations require that the products be positioned in well formed rows on the first conveyor belt in order to properly transfer all the products to the second conveyor without jamming, since these two apparatus are moving in perpendicular directions. However, many production systems do not efficiently output products to the first conveyor in well formed rows, particularly when the products are sticky or coated with a material such as chocolate, or when the production line uses oven or cooling fans that displace the products. Cross-feed systems, moreover, require large amounts of floor space, and multiple conveyors and packaging machines are generally used in order to provide redundancy to accommodate jams and other faults while providing uninterrupted transfer of products at the throughput speed of the production system. Moreover, given the difficulty of maintaining well formed rows, cross-feed systems typically do not convey products at fast enough rates to maximize the full throughput capability of downstream packaging machines. Accordingly, there is a need for improved product feed systems and techniques by which automated product output systems such as packaging and wrapping machines, palletizing systems, and the like can be provided efficiently with products in predefined groupings and configurations from production machines that output the products in uncertain fashion.

BRIEF DESCRIPTION

The present disclosure provides intelligent systems and methods for transporting products received in uncertain fashion from an input transport mechanism according to a specified product configuration to accommodate the output mechanism, by which the aforementioned shortcomings of conventional cross-feed systems can be avoided or mitigated. A transport system is provided with an array including variable speed transport modules positioned between the input and output mechanisms, and individual module speeds are controlled by a model-based planner such that products delivered with uncertainty by the input mechanism are delivered to the output mechanism synchronized and oriented according to a plan generated in real time according to the current product positions in the array. This coordinated set of transport modules synchronizes the arrival of the desired groupings of products to the output mechanism regardless of the unordered input from the production system, and can accommodate received products of different types or sizes.

In accordance with one or more aspects of the present disclosure, an intelligent product feed system is provided for transport of products from an input transport mechanism to an output mechanism along a process direction. The feed system includes an array of transport modules operated by a planner, where the array has a plurality columns of one or more modules in series between the input and output mechanisms, and where at least some of the transport modules are variable speed transport modules. The individual variable speed modules include a module transport mechanism such as a conveyor belt system in one embodiment that transports products along the process direction from a first end to a second end to provide the products to a subsequent module or to the output mechanism, as well as a speed controller and one or more sensors that detect the product location. The planner operates the modules of one or more of the array columns to transport groups of products delivered by the input transport mechanism to the array in uncertain fashion to the output mechanism synchronized and oriented according to a specified product configuration. The output mechanism may be a transport mechanism that receives products from the array and transports products received from the array along a direction transverse to the process direction, and the planner in certain embodiments controls the speed of the output transport mechanism. For a certain output mechanism, the planner may also control when each certain capability/action of the output mechanism is executed to achieve the final organized product arrangement. The planner may receive different sensor feedback signals regarding the location, weight, length or other deemed useful information of each product or group of products from individual modules and/or from different locations in the output mechanism in order to coordinate the operations of the output mechanism.

The planner in one embodiment includes an objectives component to define the specified product configuration and the quality of the way products are delivered (e.g. as few wasted products as possible) and a constraints component to define module constraints such as speed limits, acceleration/deceleration limits, limits on the module/product lengths, minimum gap between products, etc., for individual modules. The constraints may also apply to the output mechanism such as range of action execution time for each of its action/capability. The planner also includes a search component that generates a plan describing setpoint values for some or all of the modules to achieve the specified product configuration objective, taking into account the constraints and the detected product locations, weights, size, or any other useful information that are detected by sensor on the modules or on the output mechanism. Based on the plan, the search component provides setpoint inputs directly to the modules and/or the output mechanism or indirectly via one or more central controllers that are coupled with the modules and the output mechanism. The setpoints in certain implementations are time setpoints representing times when products are to arrive at the modules and different parts of the output mechanism and/or speed setpoints representing the desired module transport mechanism speeds possibly accompanied with acceleration/deceleration information for the modules and output mechanism according to the plan. The search component in certain aspects of the disclosure performs a heuristic search such as an A* search to generate the plan. Besides heuristic search, the search component can also use other alternative approaches such as local search or compiling into other substrates such as Constraint Satisfaction Problem, Satisfiablity, or Linear Programming. Moreover, the planner may be adapted to adjust the length of one or more modules equipped with adjustable length module transport mechanisms. The planner may be further operative to adapt the plan if one or more modules fail or comes back online after repair/replacement in order to continue transporting groups of products according to the specified product configuration. The planner may also adjust the speed/acceleration of the output mechanism when one or more modules come offline/online to match the objective with the newly adapted plans. The planner may include a model of the feed system, and may update the system model if one or more of the modules or some capabilities of the output mechanism fail or is repaired. The system may also include a simulation component to simulate operation of the feed system, the input transport mechanism, and the output mechanism using the model, as well as a user interface providing a visual representation of the simulated feed system and one or more user operable controls allowing modification of the simulation. The system may also include a user interface providing operational controls for the system. One or more of the array modules, moreover, may be operative to reorient products while transporting the products along the process direction in accordance with other aspects of the disclosure, and in certain implementations may include may include a rotating structure to reorient products from substantially horizontal to substantially vertical. One or more modules may be further adapted to accumulate and orient a plurality of products at the at least one module and to provide the gathered plurality of products to the output mechanism in a group. The planner may further be operatively coupled to control the output mechanism and the array of transport modules in a coordinated fashion to transport products to the output mechanism synchronized and oriented according to the specified product configuration.

In accordance with further aspects of the disclosure, a method is provided for transporting products received in uncertain fashion from an input transport mechanism to an output mechanism synchronized and oriented according to a specified product configuration. The method includes providing one or more transport objectives that define desired final product configurations and optionally define the quality of the plan governing how products are delivered, and providing one or more constraints that define limitations of transport modules in an array including a plurality columns having one or more modules between the input transport mechanism and the output mechanism with some of the modules having speed and/or lengths that are controllable. There can also be some constraints defining the limitations of the capabilities of the output mechanism. The method further includes receiving products into the array from the input transport mechanism, detecting locations of products at the transport modules, and generating a plan describing setpoint values for at least some of the modules to achieve the specified product configuration objective according to the constraints and product locations. The plan also describes if the set of capabilities of the output mechanism are executed and at which time. There can also be sensors of various kinds at different locations in the output mechanism that provide information such as locations, weight, size of a product or set of products to the planner. The method also includes providing setpoint inputs directly or indirectly to the individual transport modules and/or output mechanism to individually control the module and/or output mechanism speeds according to the plan. Certain implementations of the method further include adjusting a length of at least one of the module transport modules, adapting the plan and updating a system model if one or more modules or one or more of the output mechanism's capabilities fail or comes back online after repair/replacement, as well as simulating operation of the array, the input transport mechanism, and the output mechanism using a model representing the array. Further aspects of the method may include providing a visual representation of the simulation or the operational system, and allowing a user to modify the simulation or operational system using at least one user interface control.

BRIEF DESCRIPTION OF THE DRAWINGS

The present subject matter may take form in various components and arrangements of components, and in various steps and arrangements of steps. The drawings are only for purposes of illustrating preferred embodiments and are not to be construed as limiting the subject matter.

DETAILED DESCRIPTION

Figure 1:
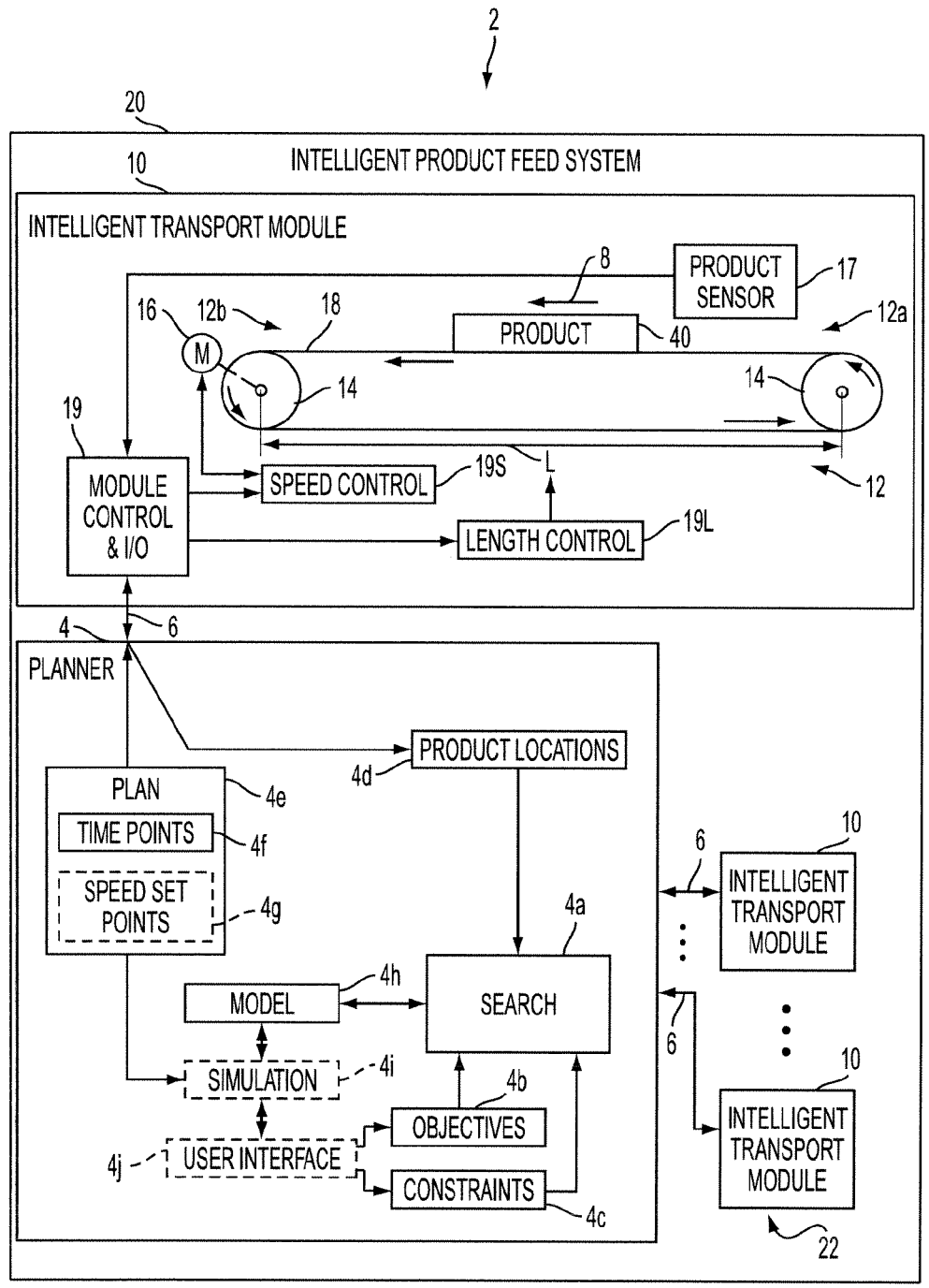
FIG. 1 is a schematic system diagram illustrating an exemplary intelligent product feed system having a plurality of product transport modules in accordance with one or more aspects of the present disclosure.

Referring now to the drawing figures, several embodiments or implementations of the present disclosure are hereinafter described in conjunction with the drawings, wherein like reference numerals are used to refer to like elements throughout, and wherein the various features, structures, and graphical renderings are not necessarily drawn to scale. The disclosure relates to systems and techniques for transporting products and is illustrated and described in connection with exemplary food product transport applications in which strudel products 40 are moved from a final production operation that outputs products via an input transport mechanism 30 in uncertain fashion to a packaging or wrapping station 60 in which groups of strudels 40 are packaged together in a stacked configuration of six products 40 using an exemplary feeding system 20 of the disclosure providing for timely organized orientation of the products 40 along a transverse output transport mechanism 50. The concepts of the present disclosure, however, find utility in association with a variety of different applications in which products of any type and form are to be transported from an input feed to an output mechanism according to a predetermined output configuration, and the illustrated embodiments are exemplary in nature and are not to be construed as limiting.

Figure 3:
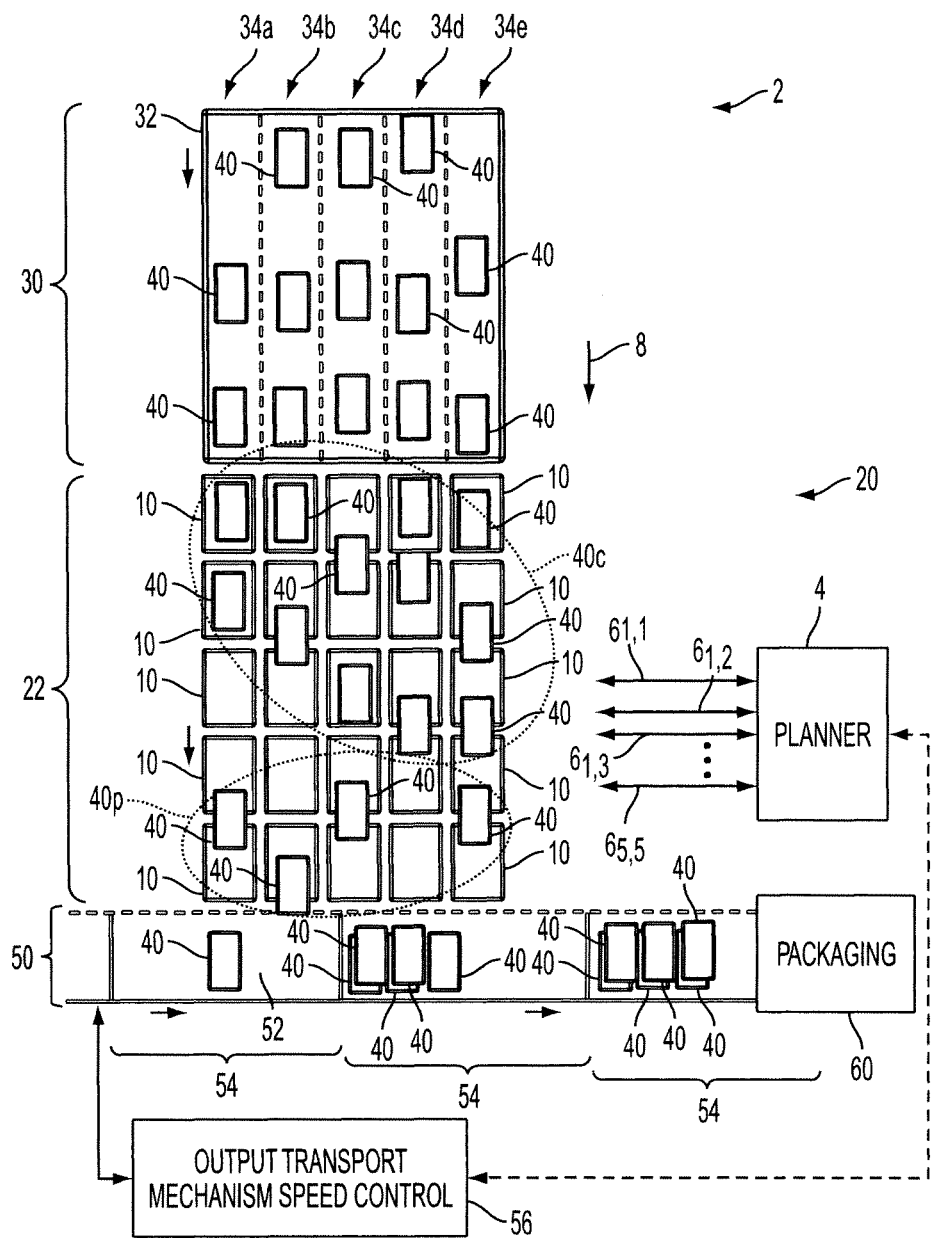
FIG. 3 is a partial top plan view illustrating operation of the product feed system of FIG. 1 in transporting food products from a random or undefined organization to a transverse output transport mechanism in synchronized fashion with the products organized according to a specified product configuration.
Figure 4:
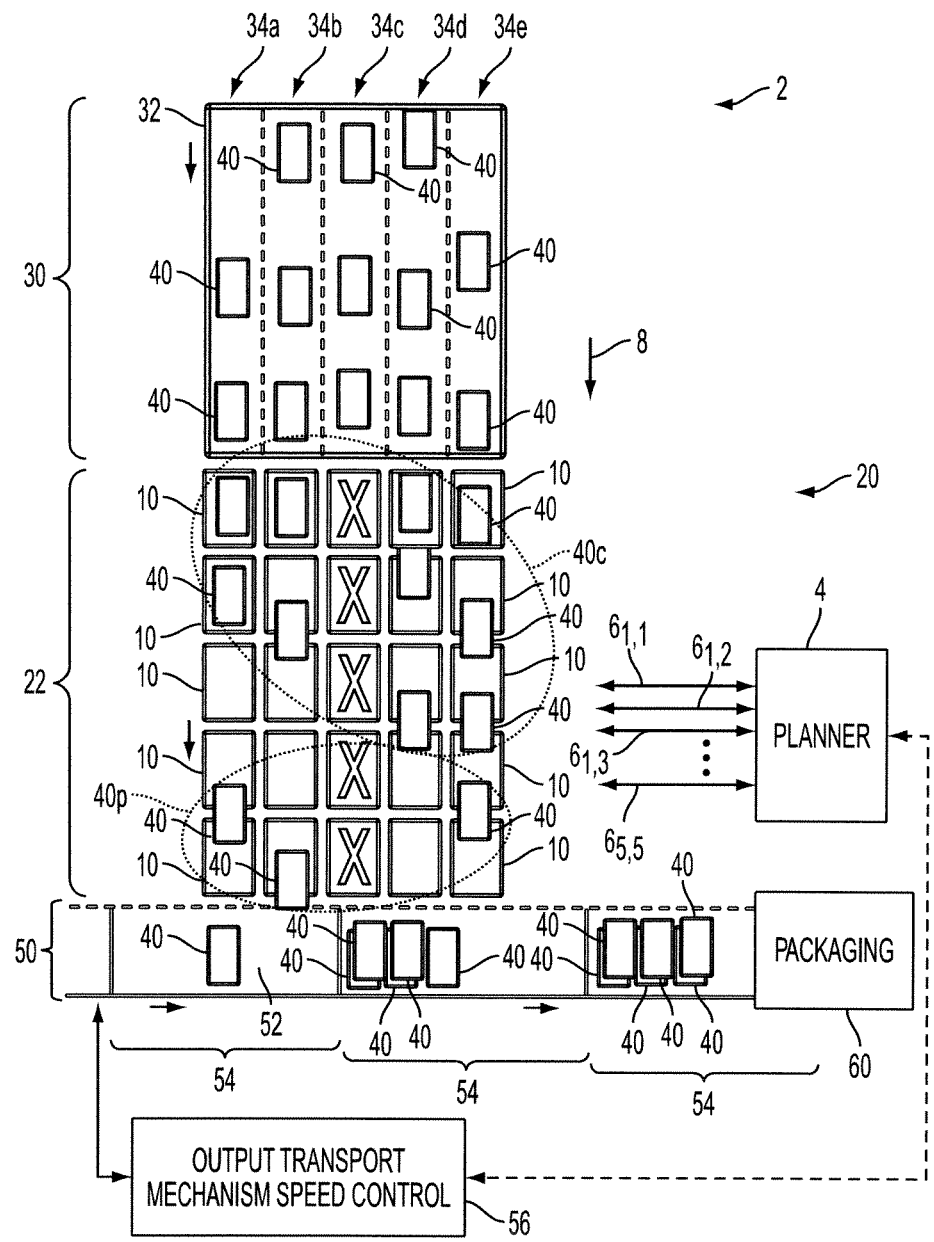
FIG. 4 is a partial top plan view of the system of FIGS. 1 and 3 with one column of array transport modules deactivated for servicing of a fault, in which the planner adapts the plan to accommodate the uninterrupted provision of products to the output mechanism according to the specified product configuration using the remaining on-line module columns.

Referring initially to FIGS. 1-4, the presently disclosed aspects are implemented as intelligent feed systems 20 providing transport solutions in which any arbitrary number, type, and form of product transport modules 10 are formed into an array or matrix 22. The modules 10 are under ultimate control of a model-based planner 4 that directs the speed, acceleration/deceleration, length, and other operational performance aspects of the modules 10 according to a plan 4e that ensures provision of products 10 to the output mechanism 50 according to a specified product configuration for presentation to a packaging apparatus 60. The system 20, moreover, is operative to automatically reconfigure itself to continue operation if one or more modules 10 fail, are removed, otherwise taken off-line, or comes back online after repair/replacement. The transport modules 10 in this regard can be heterogeneous with varying capabilities, wherein FIGS. 1, 2A, and 2B illustrate one exemplary form of transport module 10 including a conveyor belt 18, a motor 16 driving one wheel 14d of a plurality of conveyor belt wheels 14 under control of a speed control component 19S and a module control and I/O component 19. Alternatively, the motor speed, acceleration, deceleration, etc. can be controlled via one or more control elements external to the module, such as a central controller 5 (FIG. 5B below). The speed controller 19S may receive belt speed feedback or may implement various forms of closed loop or open loop speed control by providing appropriate signals to the motor 16 according to a speed setpoint and/or other setpoint information provided thereto by the control and I/O component 19 based on plan generated control information (e.g., setpoint, time point, etc.) from the planner 4.

The feed system 20 operates to transport the products 40 along a process direction 8 from the input transport mechanism 30 to the output mechanism 50 with the products 40 oriented and delivered to the output mechanism 50 in a specified product configuration regardless of the manner in which the input mechanism 30 initially delivers the products 40 to the system 20. The system 20 includes an array 22 of transport modules 10 formed into a plurality columns 34, where the illustrated example has five such columns 34a-34d, each of which having five modules 10. Other embodiments are possible having two or more columns 34 and with each column 34 having two or more modules 10, where different columns 34 may include different numbers, types, and forms of modules 10, and individual columns 34 may include different types, forms of modules 10, wherein all such variant implementations are contemplated as falling within the scope of the present disclosure and the appended claims. Within each column 34, the modules 10 are serially disposed along the process direction 8 between the input and output mechanisms 30 and 50, respectively, and one or more of the array modules 10 are variable speed modules allowing the planner 4 to adjust the speeds thereof in implementing a given plan 4e. Moreover, the modules 10 may individually have associated constraints defined in a constraints component 4c of the planner 4, such as speed range limitations, acceleration/deceleration limits, length adjustment limits, etc. In other embodiments illustrated and described below with respect to FIGS. 9-16, moreover, one or more modules 10, 310 may provide for translation of the products 40 along a process direction 8 in addition to one or more further degrees of freedom in reorienting the products 40.

Figure 2A:
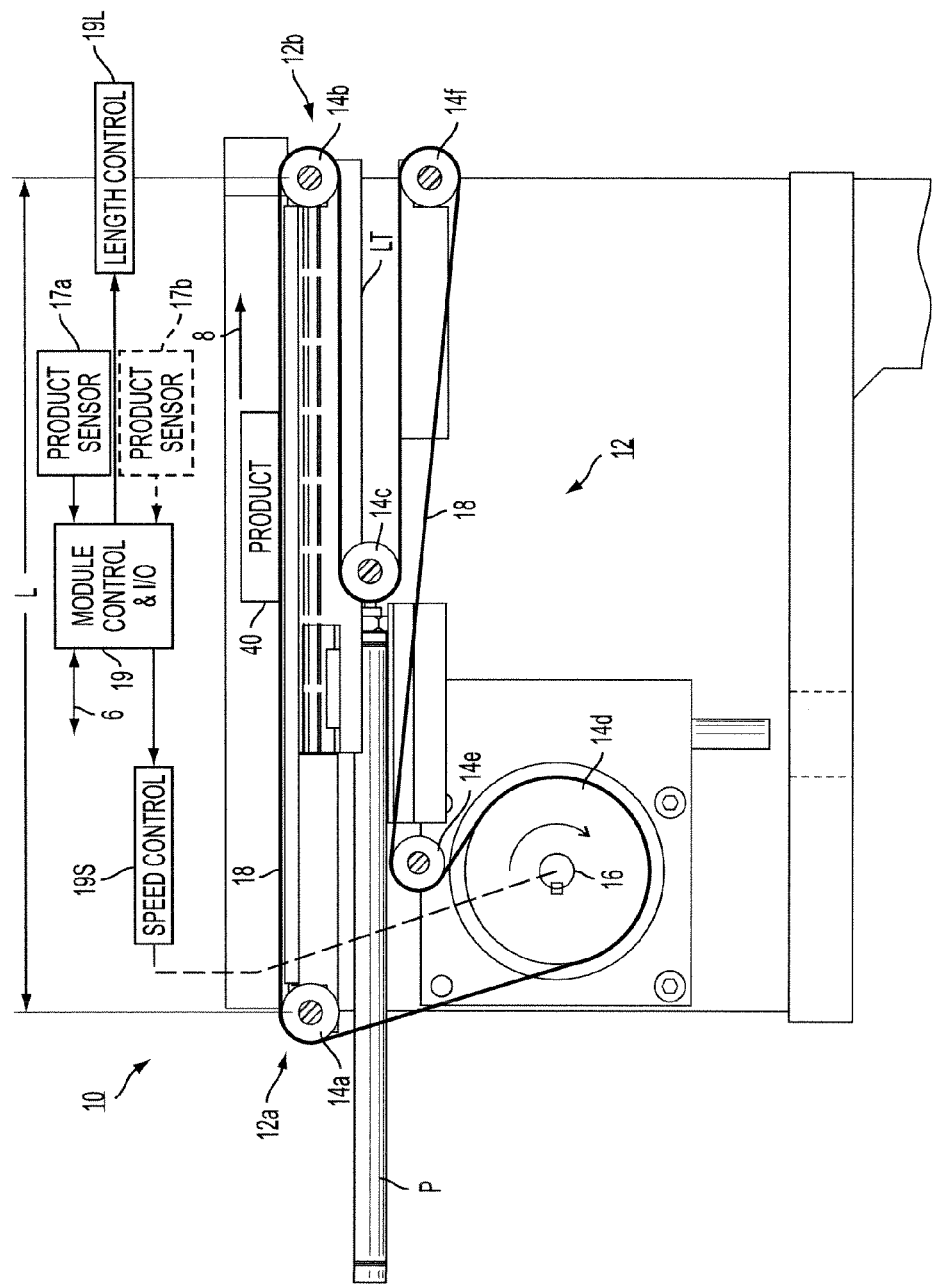
FIGS. 2A and 2B are partial side elevation views illustrating further details of an exemplary adjustable length transport module in accordance with further aspects of the disclosure.
Figure 2B:
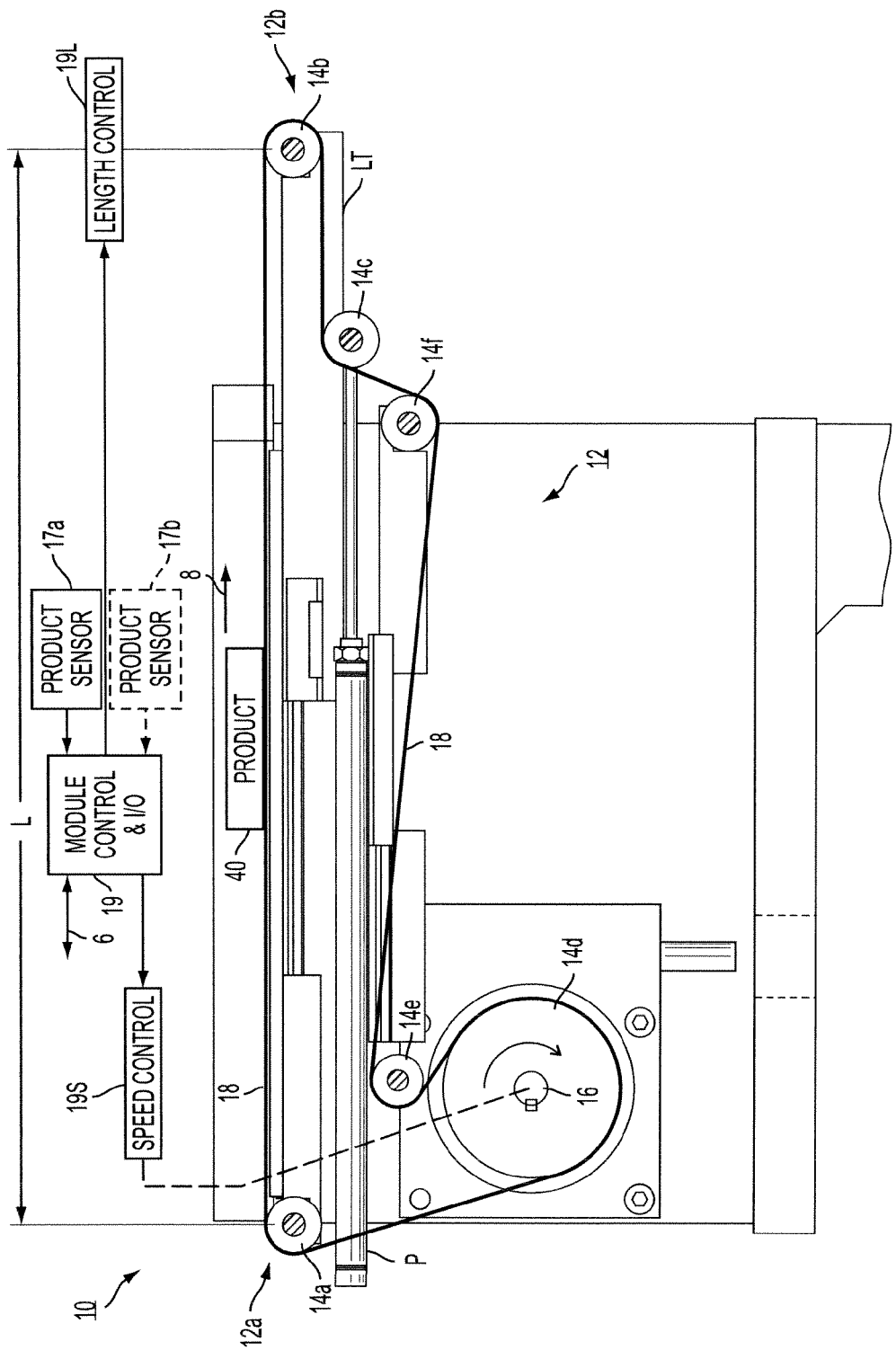

As best shown in FIGS. 1-2B, the individual transport modules 10 include a module transport mechanism 12, in this case a motorized conveyor belt system that is operable to transport the products 40 along the process direction 8 from a first end 12a that receives products 40 from a preceding module 10 or from the input transport mechanism 30 to a second end 12b to provide the products 40 to a subsequent module 10 or to the output mechanism 50. Any suitable form of transport mechanism 12 may be employed which allows products 40 to be received from a prior apparatus and which conveys the products 40 along the direction 8 and delivers the products 40 to a subsequent apparatus, wherein the disclosure is not limited to conveyor belt systems. The variable speed modules 10 further include a speed control component 19S that controls the speed at which a product 40 is transported from the first end 12a to the second end 12b. In addition, at least some of the modules 10 include one or more product sensors 17 operative to detect a location 4d of a product 40 at the module transport mechanism 12, wherein preferred implementations include at least one sensor 17a proximate the first (entrance) end 12a of the transport mechanism 12 to provide a signal to the module control component 19 to thereby inform the planner 4 that a product 40 has entered the module 10, and one or more subsequent sensors 17b may be employed to update the product position 4d as it is conveyed toward the second (exit) end 12b, although not a strict requirement of the disclosure. In this regard, any suitable form of sensor/detector may be employed by which the location 4d of product(s) traveling in the direction 8 at a given module 10 can be ascertained, and the modules 10 may transport one or more products 40 or may be empty at any given time.

Using the detected product locations 4d, the planner 4 operates the modules 10 of at least one of the columns 34, directly or indirectly, according to a plan 4e to transport groups of the products 40 delivered by the input transport mechanism 30 to the array 22 in uncertain fashion to the output mechanism 50 synchronized and oriented according to a specified product configuration. The planner 4 and the components thereof may be implemented as any suitable hardware, software, firmware, programmable logic, or combinations thereof, and may be implemented in unitary or distributed fashion. In one possible implementation, the planner 4 may be implemented as a set of sub-components or objects including computer executable instructions and computer readable data executing on one or more hardware platforms such as one or more computers, processors, stand alone control elements, etc., having one or more processors, data stores, memory, etc. The planner 4 and its components, moreover, may be executed on the same computer/processor, or in distributed fashion in two or more processing components that are operatively coupled with one another to provide the functionality and operation described herein.

The planner 4 provides model-based planning via a model 4h representing the module array 22 of the system 20 and provides plan outputs 6, such as setpoints for speed, arrival times, etc., to control and coordinate the operation of each module and the entire system 20 to implement one or more objectives or goals 4b. The planner also receives information 6 from the modules 10, such as product locations 4d, current speed values, module status/failure/fault indications, etc., wherein the information 6 exchanged may be any suitable form of signals, data values, command instructions, messaging, etc., by which the modules 10 and planner 4 interactively perform the various functions set forth herein. The planner 4 in the illustrated embodiment updates the model 4h if one or more modules 10 fail so as to continue transporting groups of products 40 to the output mechanism 50 synchronized and oriented according to the specified product configuration, and may control a speed of the output transport mechanism 50 as shown in FIGS. 3 and 4.

The planner 4 can optionally include a user interface 4j and a simulation component 4i, where the interface 4j may be employed for user entry of one or more system transport objectives that are stored in the objectives component 4b to define at least one predefined product configuration, and the interface also facilitates entry or modification of module constraints in the component 4c. The interface 4j also facilitates visual depiction of a simulation of the system or real-time operation thereof as described below with respect to FIG. 8.

The planner 4 further includes a search component 4a that generates a plan 4e describing setpoint values 4f, 4g for at least some of the modules 10 to achieve the specified product configuration objective according to at least one constraint 4c and the detected locations 4d of products 40 at the individual transport modules 10. In one preferred embodiment, the search component 4a performs heuristic search such as an A* search or a variant to generate the plan 4e. The planner 4 then provides setpoint inputs 6 directly or indirectly to the individual transport modules 10 based on the plan 4e. The search component 4a in this regard provides any suitable form of plan-based control information or setpoints 6 by which the modules 10 are operated to implement the plan 4e, for example, time setpoints 4f representing times when products 40 are to arrive at the modules 10 and/or speed setpoints 4g representing the desired module transport mechanism speeds for the modules 10, where these may be provided directly to the modules 10 or may be provided via central controller 5 as seen in FIG. 6B below. The speed setpoints 4g in certain embodiments may be annotated with acceleration and/or deceleration specifications for the individual modules 10 or groups thereof.

As best shown in FIGS. 2A and 2B, one or more of the modules 10 have adjustable process direction lengths L and the planner 4 can provide commands or signals, etc., 6 to adjust the length L of at least one of the module transport mechanisms 12. FIG. 2A shows the exemplary module 10 with six conveyor belt wheels 14a-14f guiding and driving the belt 18 in a contracted position in which the length L of the module 10 is the horizontal distance between wheels 14a and 14b with wheels 14c-14f disposed below the wheels 14a and 14b to provide for length adjustment via a linear translation mechanism LT operative to extend wheel 14b relative to wheel 14a along the process direction 8 and a piston P operative to extend the location 14c in conjunction with the extension of the mechanism LT to take up the belt slack. Under control of the planner 4, the module length L may thus be extended as illustrated in FIG. 2B, whereby the length L is increased. This feature may be advantageously employed by the planner, for example, to change one or more of the columns 34 to bypass the output transport mechanism 50, as shown in FIG. 6B below. In the illustrated embodiments, this is achieved by the planner sending desired length setpoint information 6 to the control and I/O component 19 of these modules 10, which in turn adjusts the length L via a module length control component 19L.

Figure 5A:
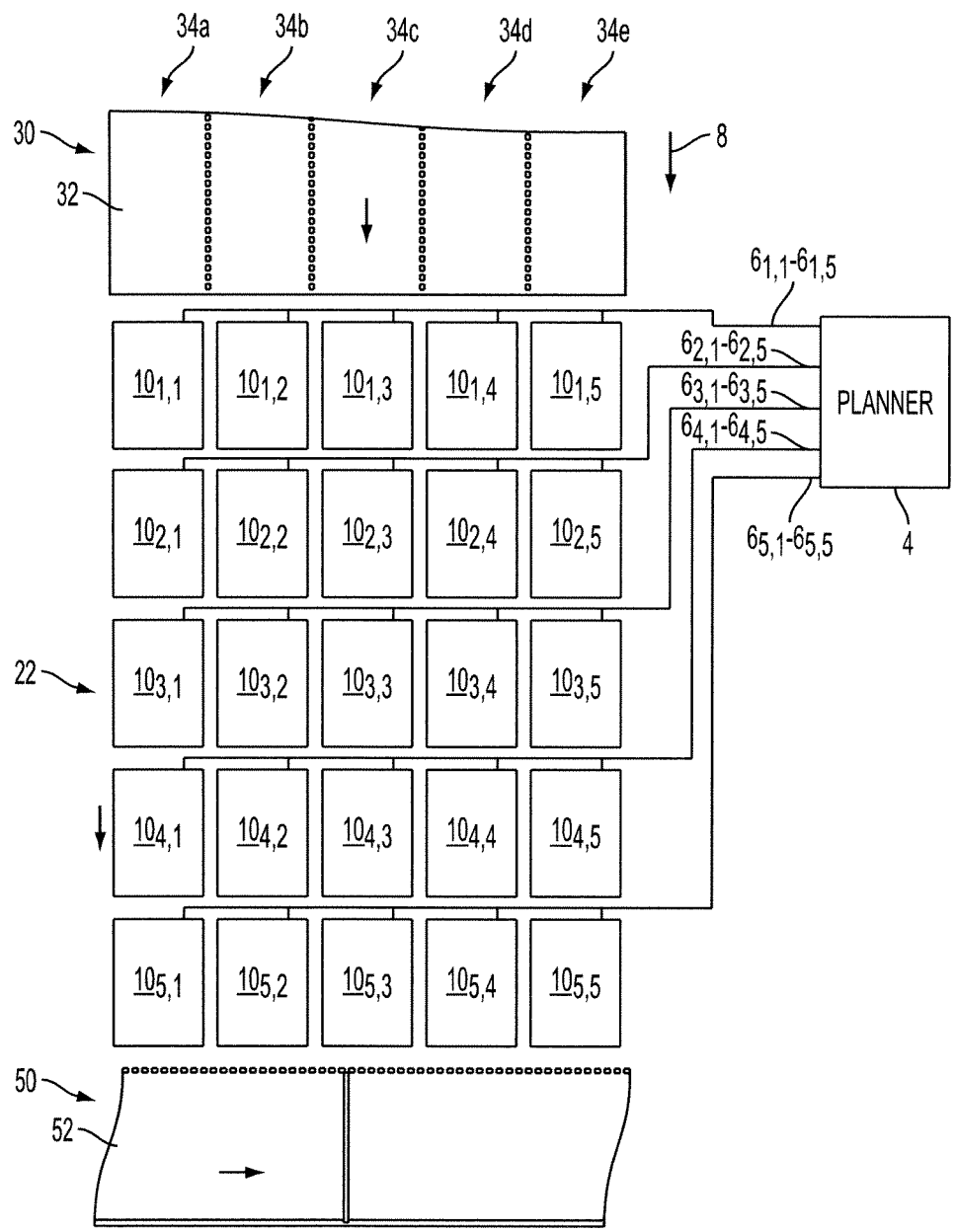
FIG. 5A is a schematic top plan view showing the transport array with the planner providing setpoints to the individual array modules in one exemplary control architecture configuration according to the disclosure.
Figure 5B:
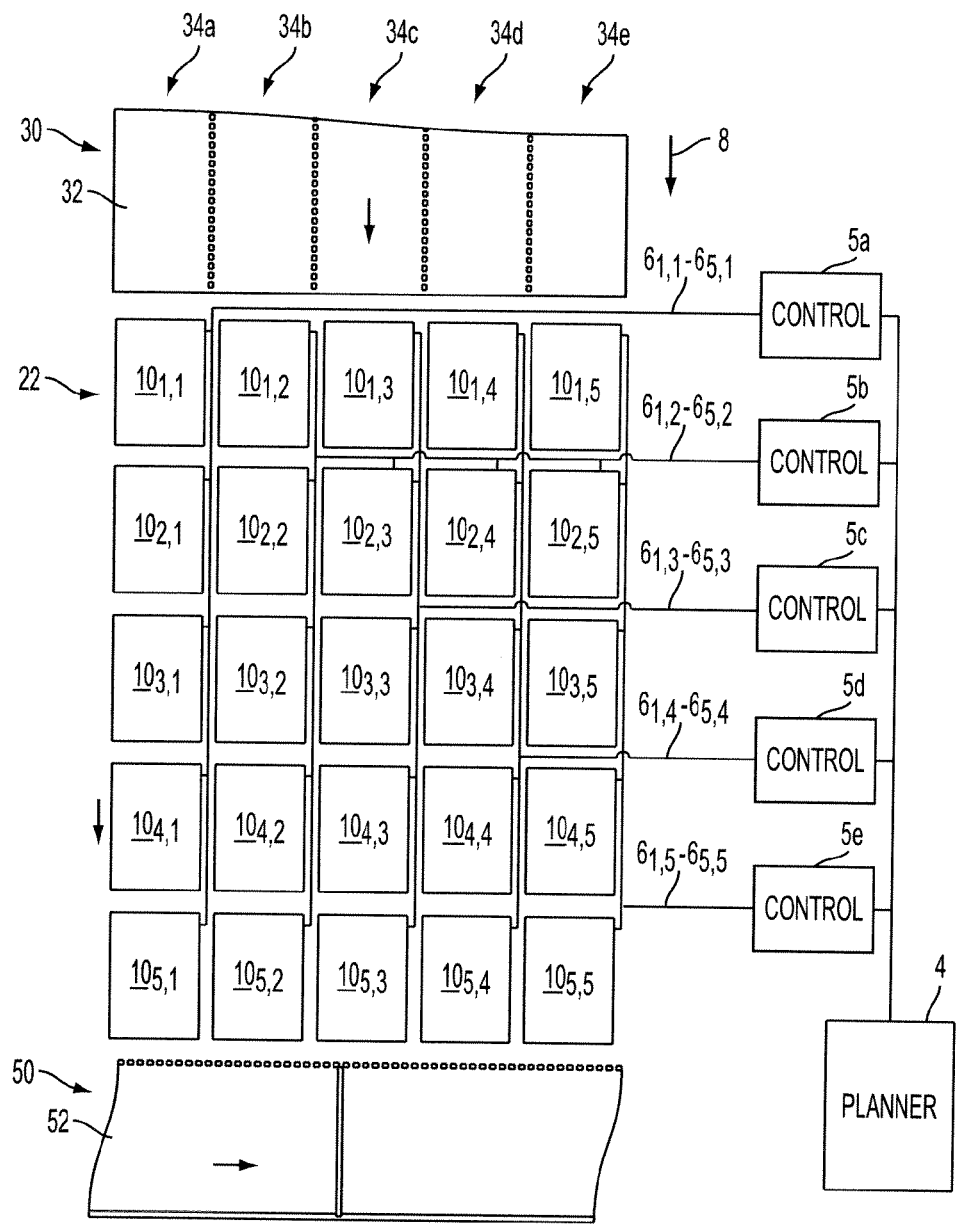
FIG. 5B is a schematic top plan view showing an alternate control configuration with the planner providing plan information to central controllers that provide setpoints to the individual array modules in accordance with another aspect of the disclosure.

As shown in FIGS. 5A and 5B, the planner 4 may provide setpoints 6 directly to the individual array modules 10 (FIG. 5A). Alternatively or in combination, the planner 4 may provide plan information 6 to one or more central controllers 5 which in turn provide setpoints 6 to the individual array modules 10 in accordance with the plan 4e as shown in FIG. 5B. In the example of FIG. 5B, central controllers 5a-5e provide setpoint control signals to the modules 10 of the respective columns 34a-34e, and the controllers 5 are coupled with the planner 4 (and possible with one another) via a network, such as a CAN bus or Ethernet. In other implementations, one or more modules 10 may exchange information 6 directly with the planner 4 while one or more other modules 10 are indirectly coupled with the planner 4 via a control component 5, wherein all such variant implementations are contemplated as falling within the scope of the present disclosure and the appended claims.

Figure 6A:
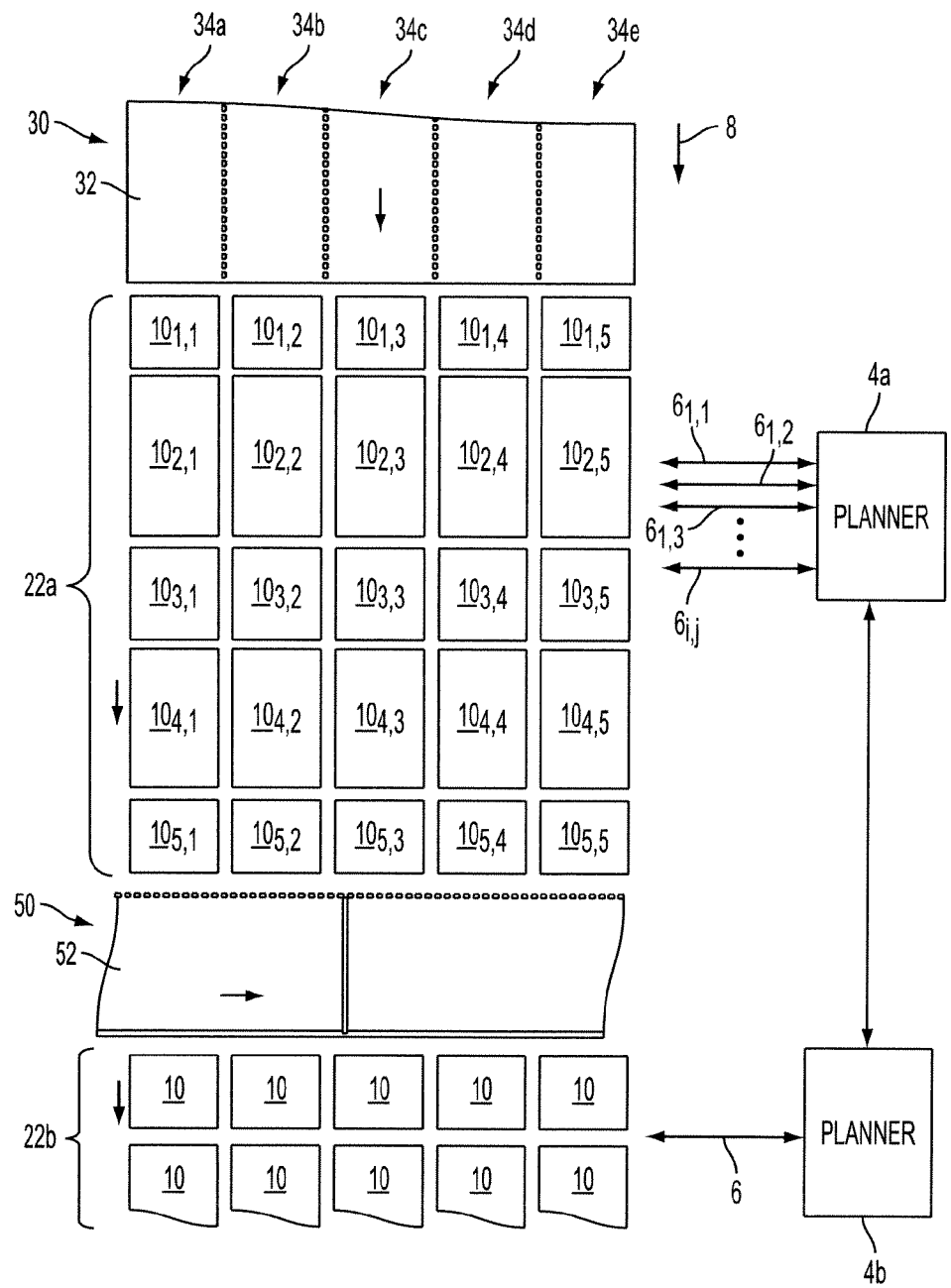
FIGS. 6A and 6D illustrate another exemplary transport module array having modules of different lengths in each column, with certain modules having adjustable lengths for extending the final row across the output transport mechanism in accordance with still other aspects of the disclosure.
Figure 6B:
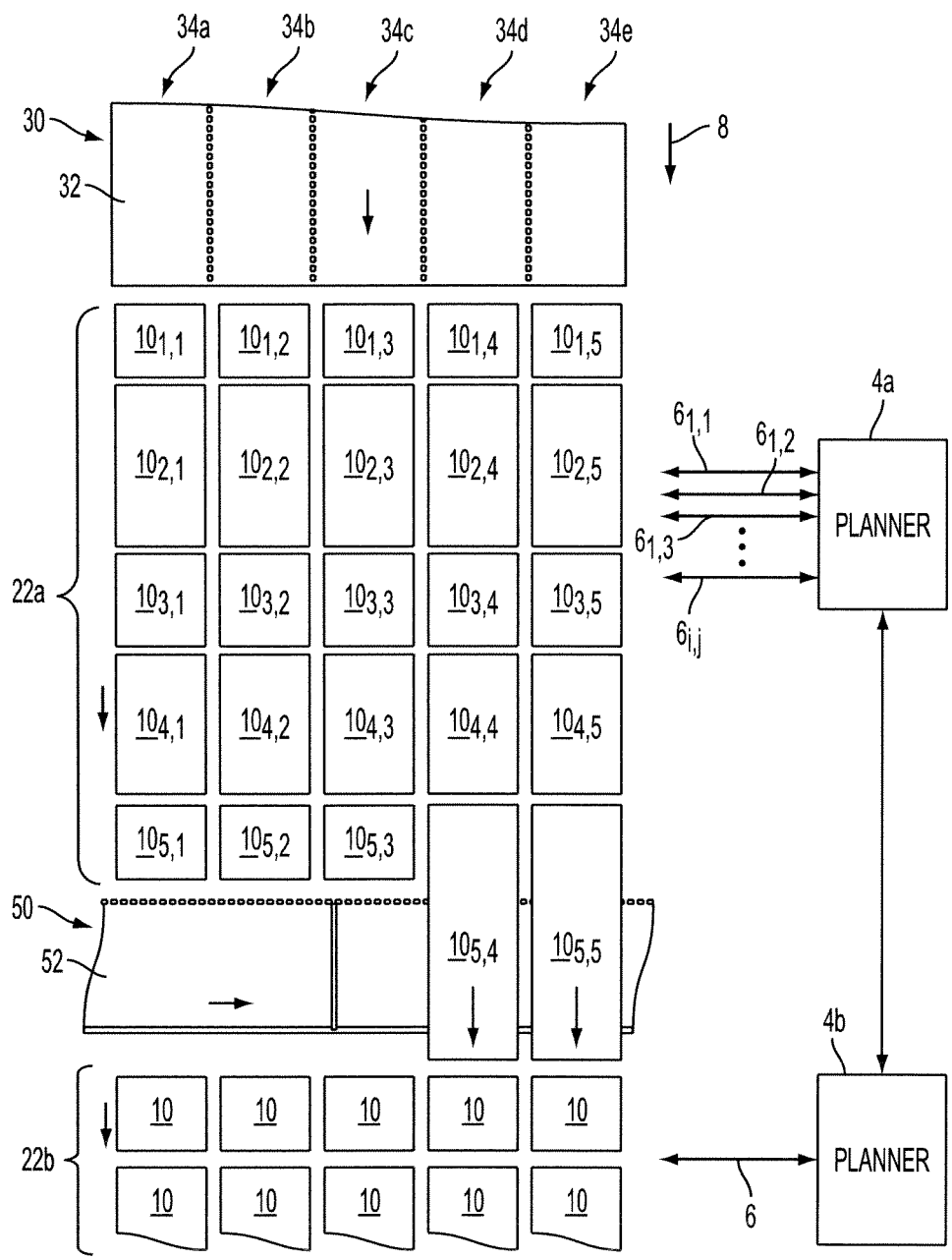
Figure 6C:
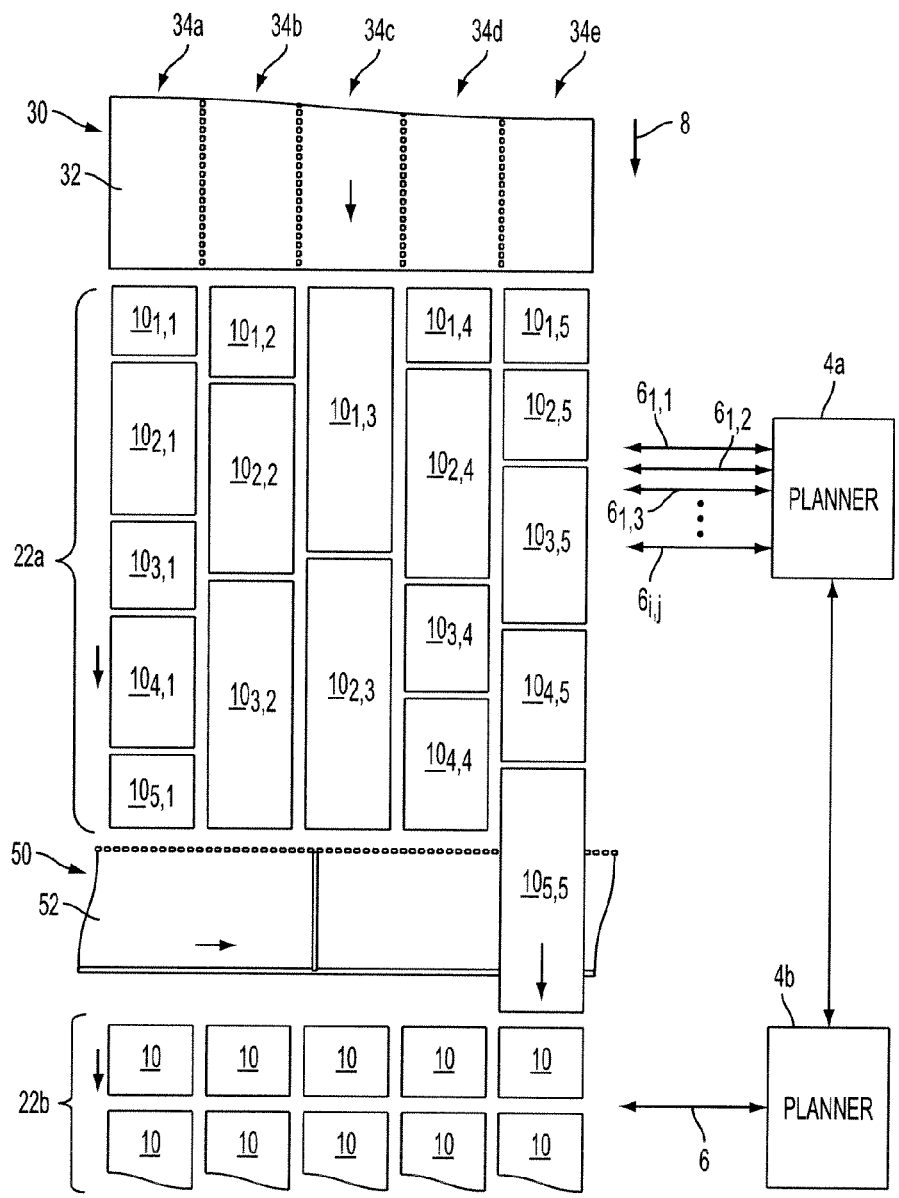
Figure 6D:
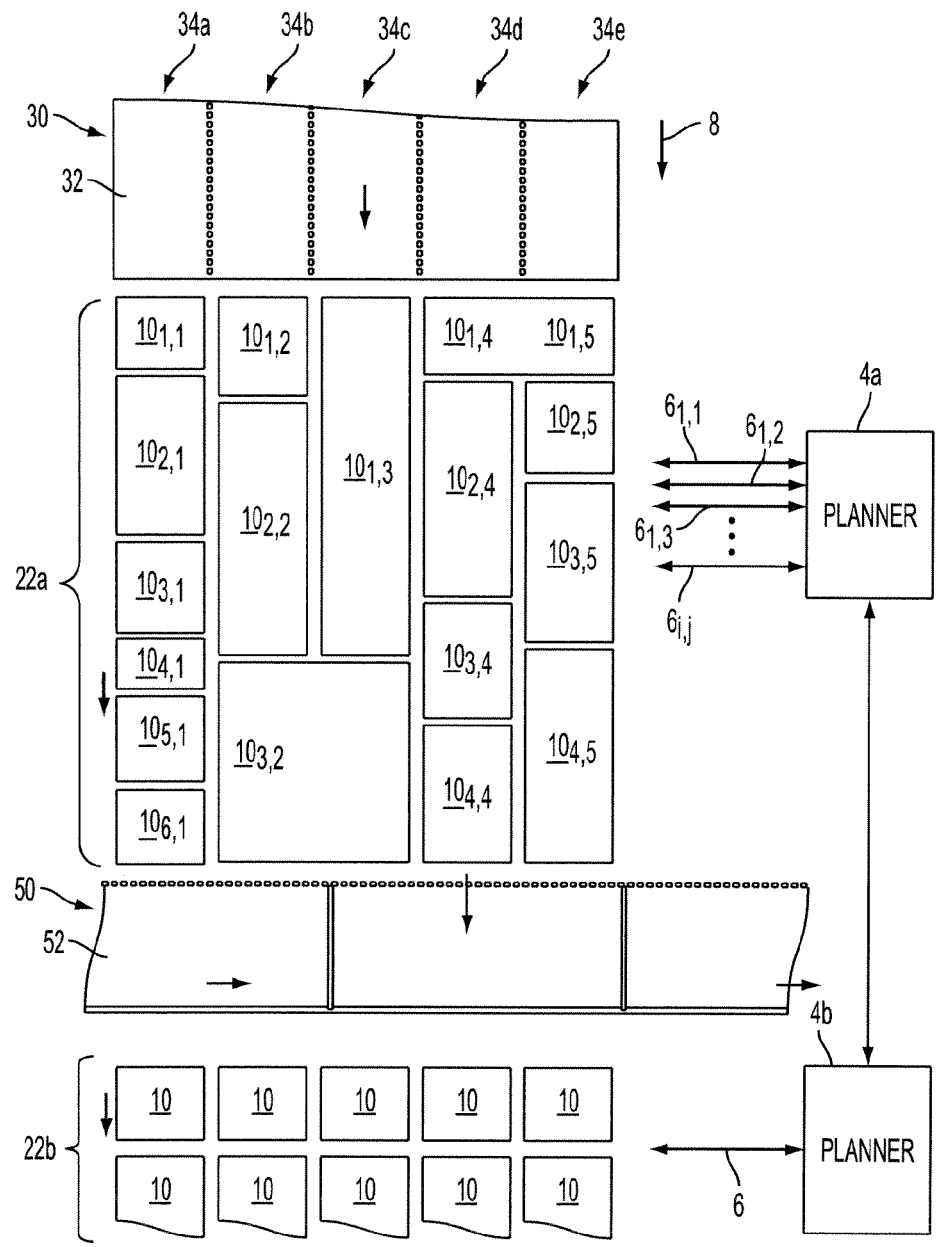

FIGS. 6A and 6D show another exemplary transport module array configuration 22 in the system 20, in which the columns 34 include modules 10 of different lengths. Although this particular embodiment includes modules 10 in a given row having the same process direction lengths, this is not a strict requirement of the disclosure. In the embodiment of FIGS. 6A and 6D, moreover, certain of the modules 10 have adjustable lengths (e.g., as shown in FIGS. 2A and 2B above). In this example, the modules $10_{5,1}$-$10_{5,5}$ in the final row of the array 22 are length adjustable. This allows the planner 4 of a first array 22a to advantageously extend the final row across the output transport mechanism 50, in one example, to move products 40 from columns 34d and 34e to a subsequent transport array 22b instead of providing those products 40 to the output mechanism 50.

Figure 7:
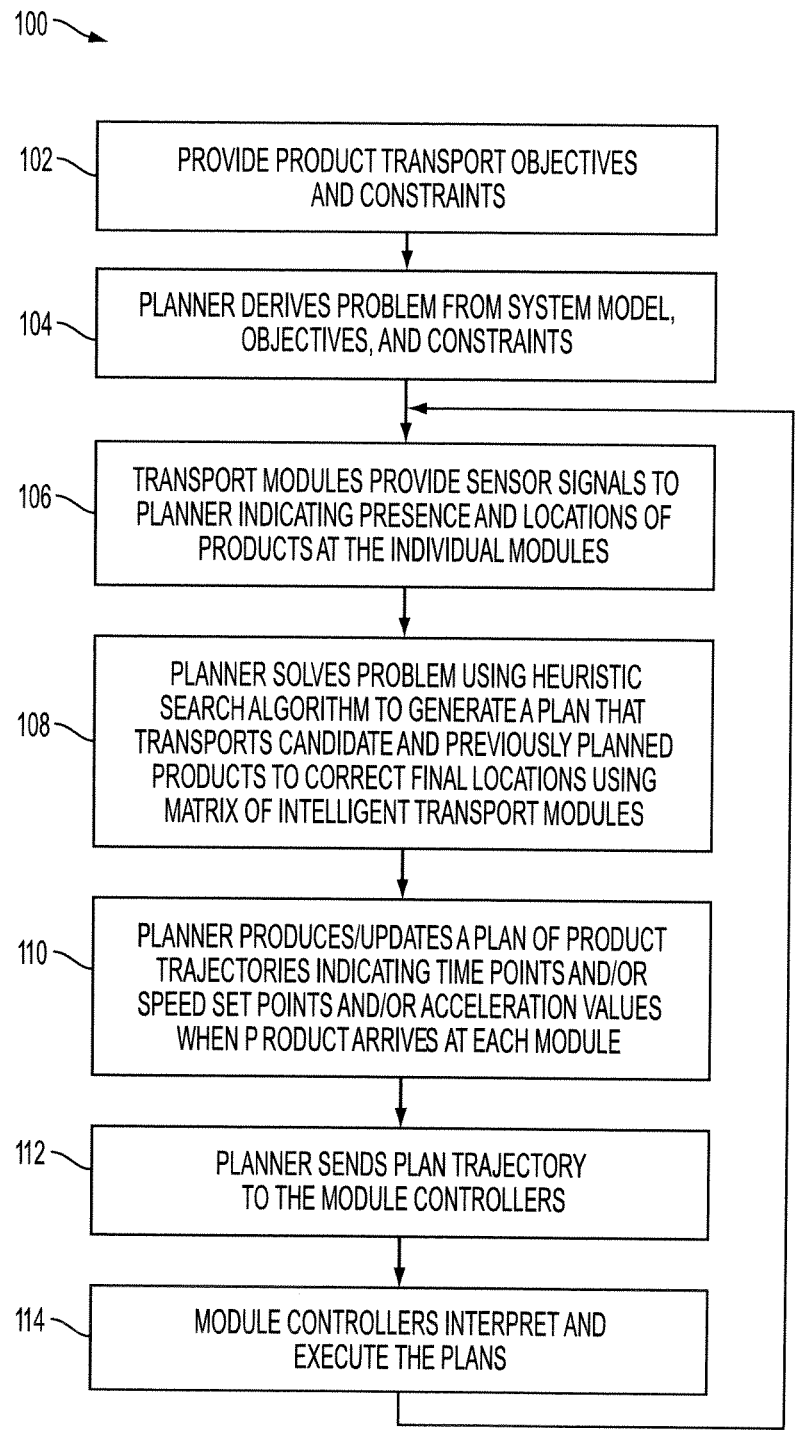
FIG. 7 is a flow diagram illustrating an exemplary method of transporting products received in undefined fashion from an input transport mechanism to an output mechanism according to the disclosure.

Referring now to FIG. 7, further aspects of the disclosure provide methods for transporting products 10 received in uncertain fashion from an input transport mechanism 30 to an output mechanism 50, wherein FIG. 7 illustrates one such method 100 that may be employed in operation of the planner 4 and the array 22 of the exemplary systems 20 described above. Although the exemplary method 100 in FIG. 7 is illustrated and described hereinafter in the form of a series of acts or events, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated method 100 other methods of the disclosure may be implemented in hardware, software, or combinations thereof, such as in the exemplary systems 20 described above, and may be embodied in the form of computer executable instructions stored in a computer readable medium.

The method 100 provides for transportation of products 40 received in uncertain fashion to an output mechanism 50 synchronized and oriented according to a specified product configuration, wherein product transport objectives 4b defining at least one specified product configuration are provided at 102. In addition, one or more constraints 4c are provided at 102 that define at least one constraint of one or more individual modules 10 of the array 22. The objectives 4b and constraints 4c in one example are provided by a user via the user interface 4j. Alternatively or in combination, the objectives 4b may be provided by another control component operatively associated with the production system 2 in a manufacturing facility. Moreover, the constraints 4c may be provided to the planner 4, at least in part, by the modules 10 themselves, for instance, where a module status changes and the module 10 can no longer achieve a certain speed, etc. At 104, the planner 4 derives a problem formulation based at least in part on the objectives 4b.

As products 40 are received from the input transport mechanism 30 into the array 22, the modules 10 detect the locations 4d of the products 40 and provide sensor signals at 106 to the planner 4 or otherwise convey the product locations 4d to the planner 4 to indicate the presence of products 40 at the modules 10. In the illustrated examples of FIGS. 3 and 4, the problem is to use the array 22 of modules 10 to create a grouping of strudel products 40 arranged in three successive stacks of two strudels 40 in each delineated section 54 of the output transport conveyor belt 52 in the output mechanism 50. In this case, the output belt 52 is moving products 40 transverse to the process direction 8 toward the packaging station 60 according to a speed control element 56 that may receive a speed setpoint from the planner 4 for coordinating the output transfer between the array 22 and the output belt 52. At 108, the search component 4a of the planner 4 solves the problem using a heuristic search algorithm, such as by performing heuristic search in one embodiment, to generate a plan 4e at 110 that transports all candidates to the correct specified locations for delivery to the output belt 52 using the module array 22. The generated plan 4e describes setpoint values 4f and/or 4g for at least some of the modules 10 to achieve the specified product configuration objective 4b taking into account the constraint(s) 4c and the detected product locations 4d. In one embodiment, the planner then sends plan time points 6 directly or indirectly to the individual transport modules 10 at 112, and the modules 10 translate these into speed setpoints at 114 to individually control the module speeds according to the plan 4e. In this regard, the planner 4 may produce a plan of product trajectories describing a sequence of time points 6 when products 40 are to arrive at each module 10, with the modules 10 (or controllers 5 of FIG. 5B) translating the time points into speed setpoints 6 that can be used to drive the module transport mechanisms 12. Alternatively, the planner 4 may produce a plan of product trajectories that includes time points and the product speed and/or acceleration values at those time points. Other variant implementations are possible in which control information 6 is derived from the plan 4e and is used by the planner 4 to operate the modules 10 accordingly, and all such alternative embodiments are contemplated as failing within the scope of the present disclosure and the appended claims.

In accordance with further aspects of the disclosure, the method 100 may further include controlling the output mechanism speed according to the plan 4e, for example, as depicted in FIGS. 3 and 4 above. In addition, the method 100 may include selectively adjusting a length L of at least one of the module transport modules 10, for instance, as illustrated and described above in connection with FIGS. 6A and 6B. Moreover, as shown above in FIG. 4, the method 100 may also include adapting or modifying the plan 4e if one or more of the array modules 10 fail in order to continue transporting groups of products 40 to the output mechanism 50 synchronized and oriented according to the specified product configuration, as well as updating the model 4h representing the array 22 if one or more modules 10 fail.

Figure 8:
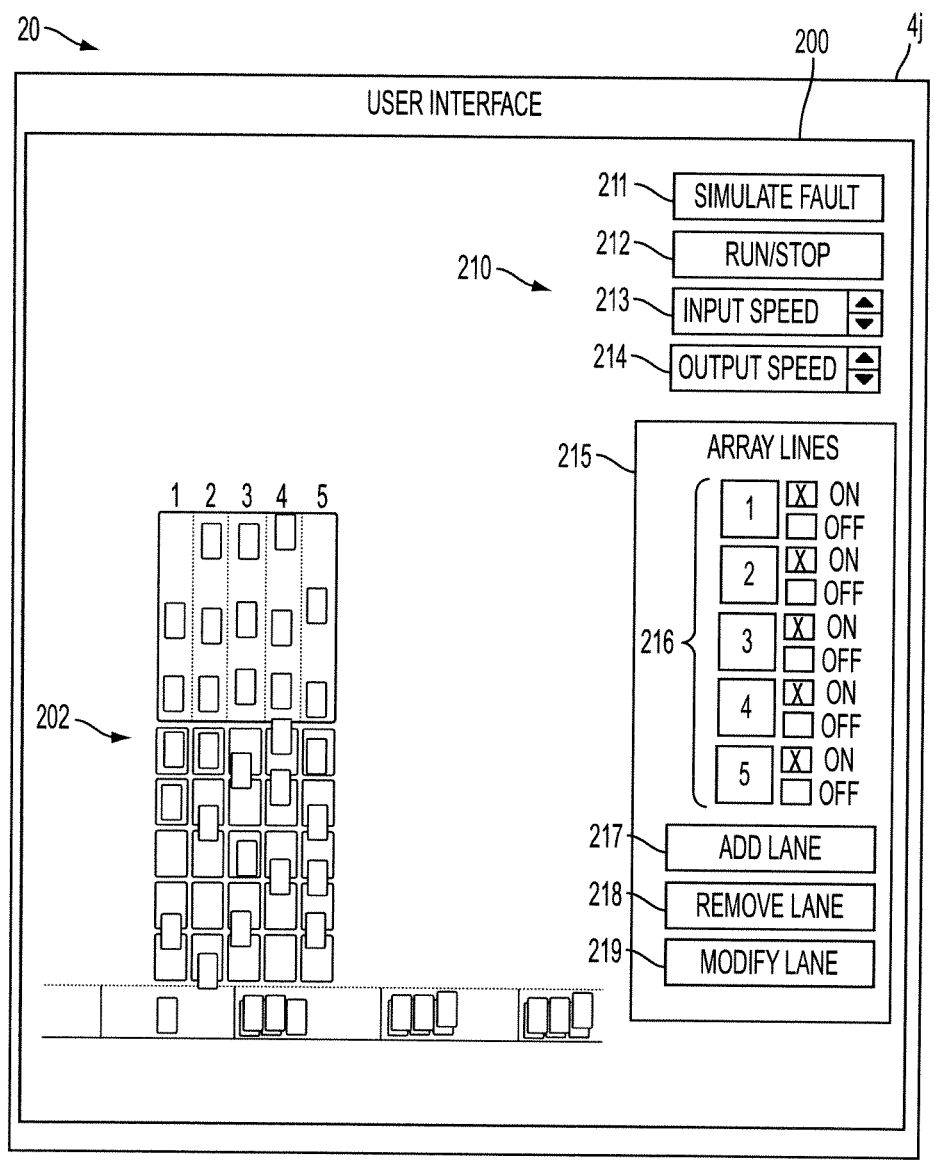
FIG. 8 is a partial side elevation view illustrating an exemplary graphical user interface rendering a visual representation of a system simulation in accordance with further aspects of the present disclosure.
Figure 9:
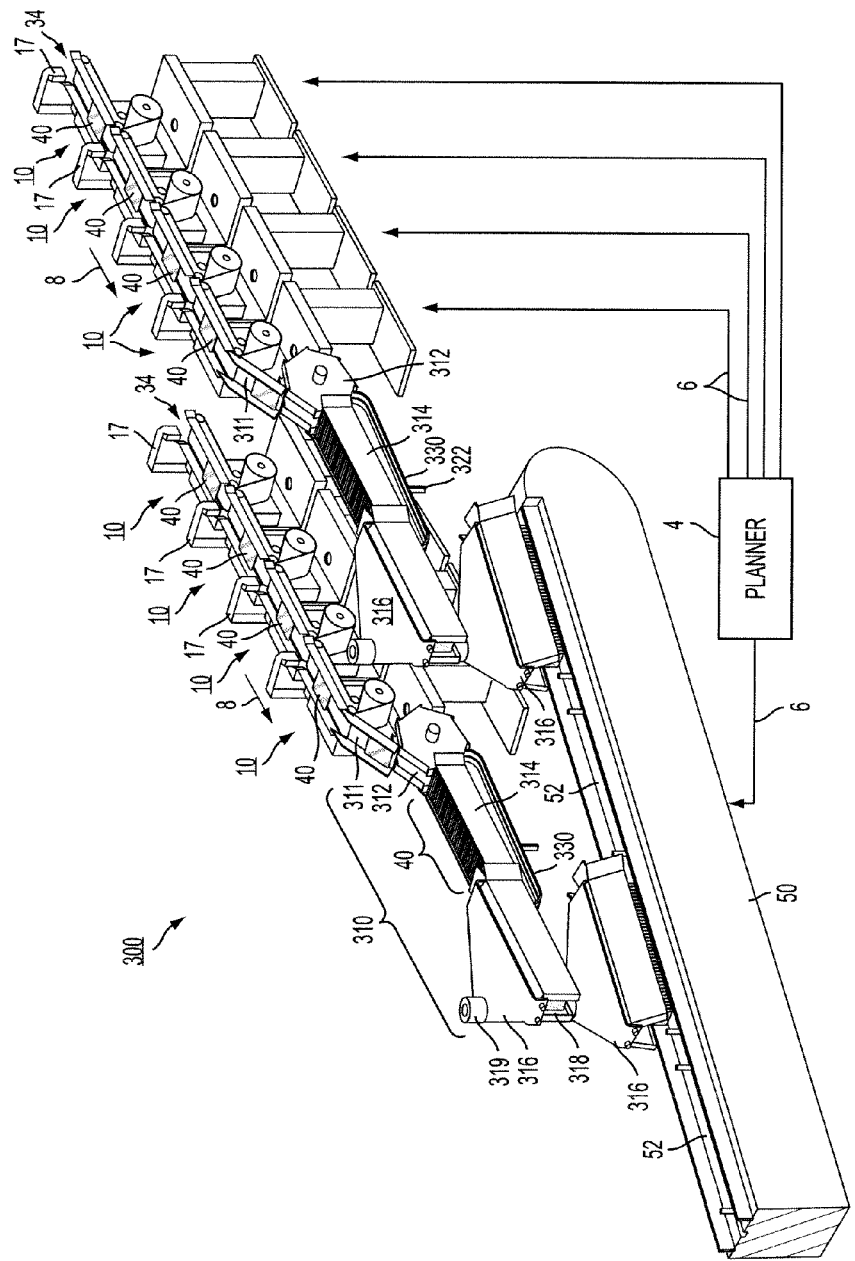
FIGS. 9-14 are a perspective, side elevation, and top plan views illustrating another exemplary intelligent product feed system in accordance with further aspects of the present disclosure having a plurality of product transport modules formed in lanes with final modules providing planner-controlled translation from horizontal to vertical product orientation to provide multi-product loads to an output mechanism prior to product wrapping.

Referring also to FIGS. 1, 3, and 8, FIG. 8 illustrates an exemplary graphical user interface 4j in the system 20, which is operatively coupled with the planner 4, and which may be integrated into the planner 4 or may be separate therefrom. The interface 4j is operative to render or otherwise present a visual representation of a system simulation 202 of the operation of the array 22, the input transport mechanism 30, and the output mechanism 50. In this example, the simulation component 4i of the planner 4 employs the model 4h and various user simulation input parameters to create the simulation, and the interface 4j provides a visual representation to illustrate operation of the intelligent feed system 20 to a user in accordance with further aspects of the present disclosure. The interface 4j, moreover, may provide the visual representation of the simulation during real-time operation of the product feed system 20, with the product images being generated based on the real-time sensing of the product locations 4d.

The user may be provided with one or more interface controls 210 to facilitate modification of the simulation 202 by the user. The controls 210 may be useful, for example, to simulate module or other faults via the control 211, to start and stop the simulation via control 212, and/or to change a simulated input feed or output transport speed via controls 213 and 214, respectively. In addition, the user may modify array operational properties via controls 215 including selectively turning certain of the array columns (lanes) 34 on or off via controls 216, adding or removing columns using controls 217, 218, and modifying lane characteristics (e.g., changing module types, lengths, numbers of modules in the lane, etc.) via control 219.

The various controls 210 or sets of them, may be operable in both off-line simulation/design modes, and in real-time system monitoring modes, whereby the interface 4j provides a user with the ability to view the system operation remotely while having some control (e.g., to turn off certain lanes/columns for repair, replacement of modules 10), and also to allow system designers to test different potential array configurations under different operational scenarios. Moreover, one or more of the operational controls 210 may be provided to external control elements in a production facility apart from the interface 4*j*, for example, to allow a higher level control layer to impart changes in a given system 20 in conjunction with control of other facility systems. The interface 4*j*, moreover, facilitates ease and speed of system changeover, for example, to accommodate changes in the particular type of products 40 being handled, different packaging configurations, etc., while allowing system designers to test, optimize, and/or monitor various machine configurations.

The systems 20 and methods 100 of the disclosure may be advantageously employed to provide product transport and organization between an uncontrolled feed from the upstream input mechanism 30 to accommodate the spatial and temporal input requirements of the output mechanism 50 as dictated by the objectives 4*b* and resulting problem solved by the planner 4. In the above described applications for food product transportation, for instance, an important goal is to accommodate continuous operation of the production system and continuous (yet unpredictable) input from the input mechanism 30. Another exemplary objective is that the output mechanism 50 and the associated packaging/wrapping station 60 (FIGS. 3 and 4 above) should not be stopped. Other applications for the disclosed systems and techniques include a feed system 20 to transport small products 40 such as crackers, in which the planner 4 employs the modules 10 in the array 22 to collate the crackers 40 into slug feeder output mechanisms 50 that compensate in real-time for variations in weight, length, and count in order to satisfy specific objectives such as minimum weight. In this regard, the output mechanism 50 need not be a transport mechanism in all embodiments of the present disclosure. Moreover, the planner may control the execution of different capabilities of the output mechanism such as when to move the plurality of products from one part of the output mechanism to the other and in which way to accommodate a final objective. The disclosure, moreover, can also be extended to allow simultaneous feeding of products of different types or flavors from the input mechanism 30 and transport via the array 22 to one or more output mechanisms 50 for wrapping into multiple wrappers to create multi-product variety packs inline. The present disclosure also finds utility in cartoning applications, case packing, palletizing, and other types of packaging and/or wrapping machines in the food, beverage, pharmaceutical and other industries, wherein these and the illustrated embodiments are merely examples and are not exhaustive of the uses contemplated as falling within the scope of the disclosure and the appended claims.

The disclosure accordingly provides the model-based planner 4 that generates the plan 4*e* to satisfy specified goals and constraints given a model of the system modules describing all available actions, constraints, and resources. The plan 4*e* will also try to optimize for one or more objective functions. The exemplary plan 4*e* comprises a workflow schedule of when each module action is executed and how those actions use different module resources 10, 310 and times to satisfy goals and constraints and to optimize for the given one or more objective functions. The planner accounts for all the existing and future products 10 in the array 22 at any given time, and continuously updates the plan 4*e* by solving the problem formulation to schedule planned products 40*p* (FIGS. 3 and 4) for delivery at a given time/location and uses incoming candidate products 40*c* to refine the plan 4*e* in continuous fashion. The planner 40 also identifies and works around failures/faults in modules 10 and adapts the plan 4*e* accordingly so as to attempt usage of as many of the products 10 in the array 22 as possible, and may purge any products 40 that cannot be utilized in the revised plan 4*e*. In this regard, various bypass routing mechanisms may be incorporated in and around the array 22, and/or the array modules 10 may be adaptable under control of the planner 4 to remove one or more of the products 40 in such situations.

In the case where a module 10 fails, moreover, the planner 4 updates the model 4*h*, for instance, to reflect the module failure and the corresponding unavailability of modules 10 in that column/lane 34 pending replacement/repair of the failed module (e.g., as shown in FIG. 4). The planner 4 then attempts to plan removal of some or all the products 40 that are currently on and are coming into the disabled column 34*c* (e.g., in the future) from the candidate set 40*c*, and again generates an updated plan 4*e* (e.g., using an A* search) using only the candidate products 40*c* from functioning columns 34*a*, 34*b*, 34*d*, and/or 34*e*. The planner 4 in the illustrated embodiments also selectively adjusts the speed of the output transport belt 52 via control 56 (e.g., the packaging/wrapping "infeed" speed) to match the new incoming rate (e.g., to lower the speed of belt 52 if some lanes 34 are out-of-service or to increase the speed if some lanes 34 are returned to service).

Referring now to FIGS. 9-14, FIG. 9 shows another exemplary product feed system 300 with a number of lanes or columns 334 individually including a plurality of variable or fixed-speed, adjustable or fixed-length conveyor belt modules 10 as described above as well as an end module 310 for each lane 34. The end module 310 of each lane 34 in this system 300 is operative to reorient the products 40 from horizontal to vertical while transporting the products 40 along the process direction 8. In this embodiment, moreover, the end modules 310 include a ramp structure 311 onto which products 40 (e.g., crackers in one example) are delivered by a preceding belt module 10.

Figure 10:
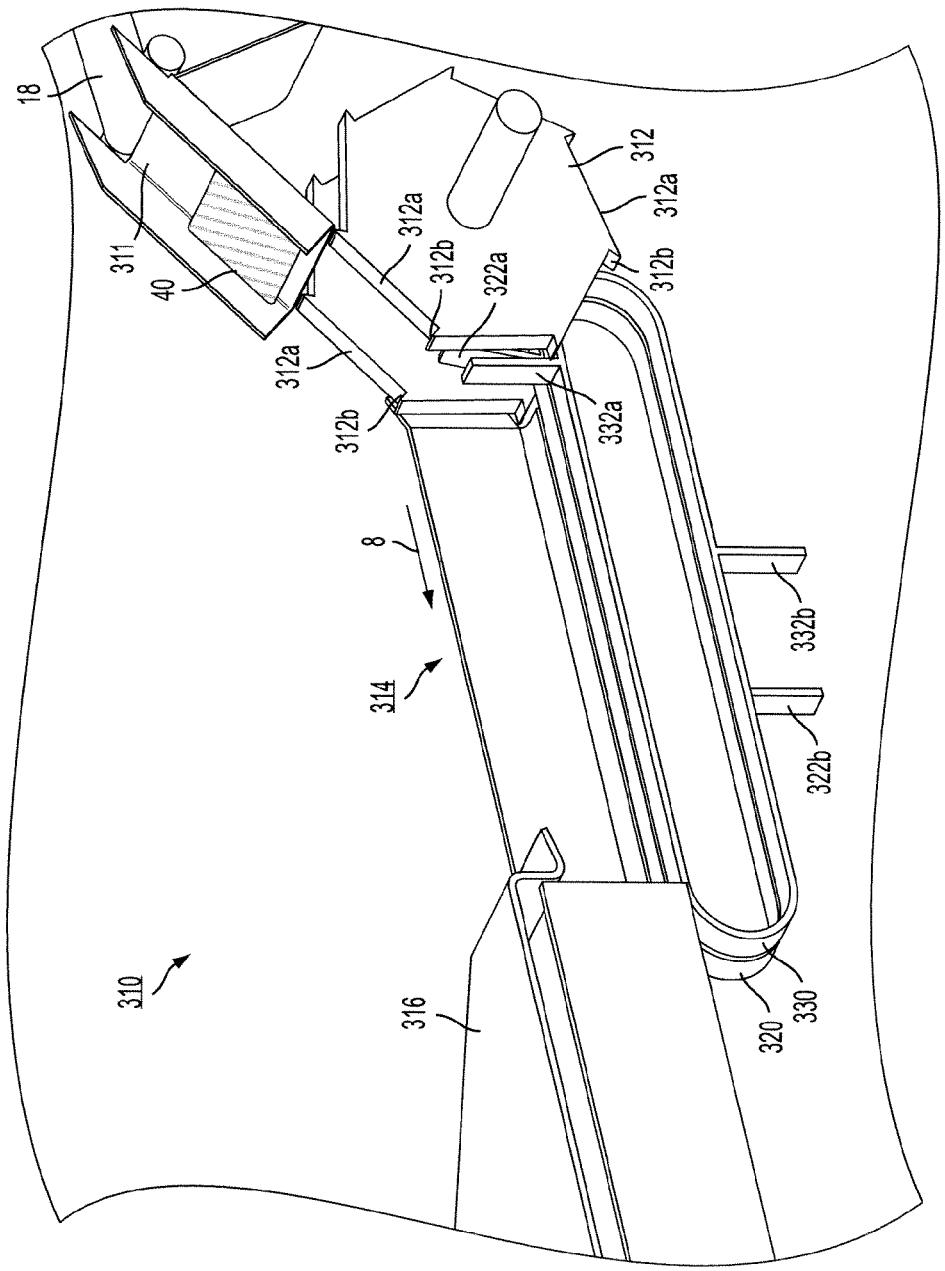
Figure 11:
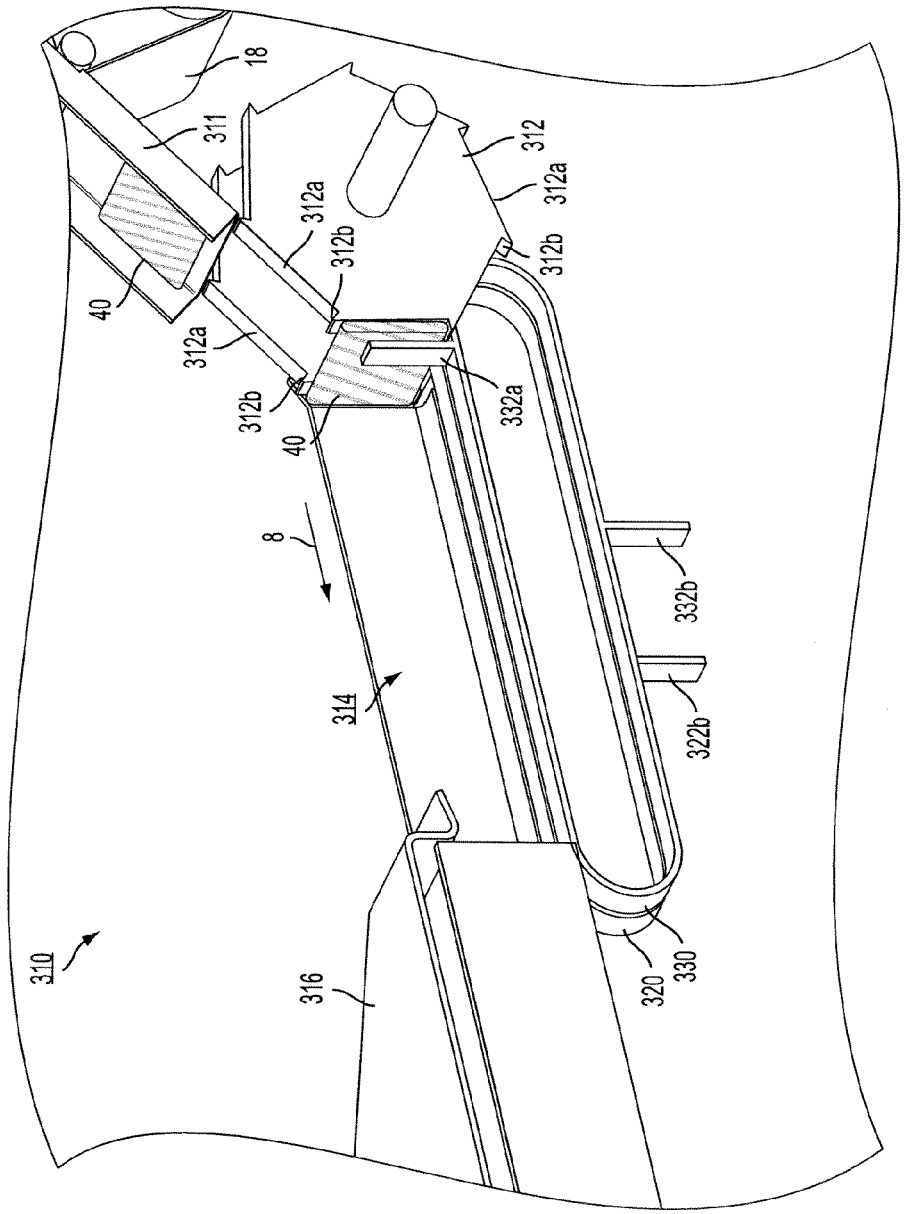

As best shown in FIGS. 10 and 11, the product 40 is received by the end module 310 in a substantially horizontal orientation and moves (through gravity in this embodiment) at a downward angle along the ramp 311 and is provided to a rotating star wheel 312. The star wheel 312 includes seven flat product-receiving surfaces or sets thereof 312*a* with end abutment features or stops 312*b*, with the speed and position of the wheel 312 being controlled according to the plan via signals/values 6 from the planner 4 to rotate in a manner coordinated with the preceding belt module 10 to receive the product 40 from the ramp 311 at a time when the receiving surface(s) 312*a* are substantially at the ramp angle or slope (FIG. 10), and the further rotation of the wheel 312 operates to orient the received product 40 substantially vertically and deliver the vertically oriented product 40 to a slug loader apparatus 314 (FIG. 12).

The loader 314 accumulates a slug or load of two or more products 40 in an elongated passage equipped to measure the weight of the accumulated products 40 and a length of the accumulated products 40 in the passage, and provides the planner 4 with the accumulated length and weight values. During the accumulation, the loader apparatus 314 employs a first belt 320 with lugs 322*a* and 322*b* and a second belt 330 with lugs 332*a* and 332*b* to maintain the vertical product orientation under control of the planner 4. As shown in FIGS. 10 and 11, the planner 4 positions the belt 330 such that a first belt lug 332*a* is positioned to vertically support one product 40 between the when surface 312*a* and the lug 332*a*, and initially positions the belt 320 with a lug 322*a* behind the lug 332*a* by about one product width. In this manner, once a first product is vertically oriented by the star wheel 312 (FIG. 11), it is supported vertically by the leading lug 332*a* with the lug 322a behind it. The planner 4 then indexes the leading lug 332a by one product width to allow placement of the next product 40 behind the first.

Figure 12:
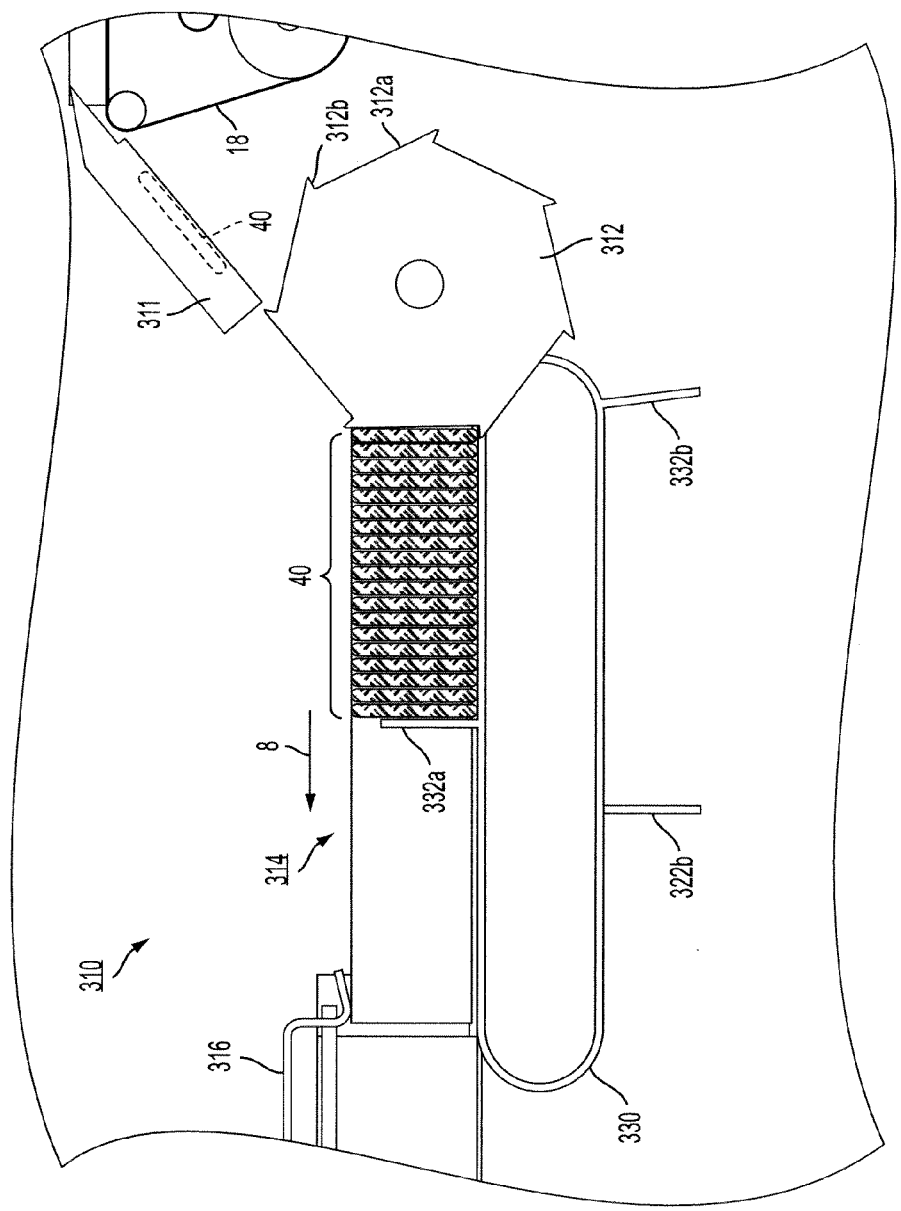
Figure 13:
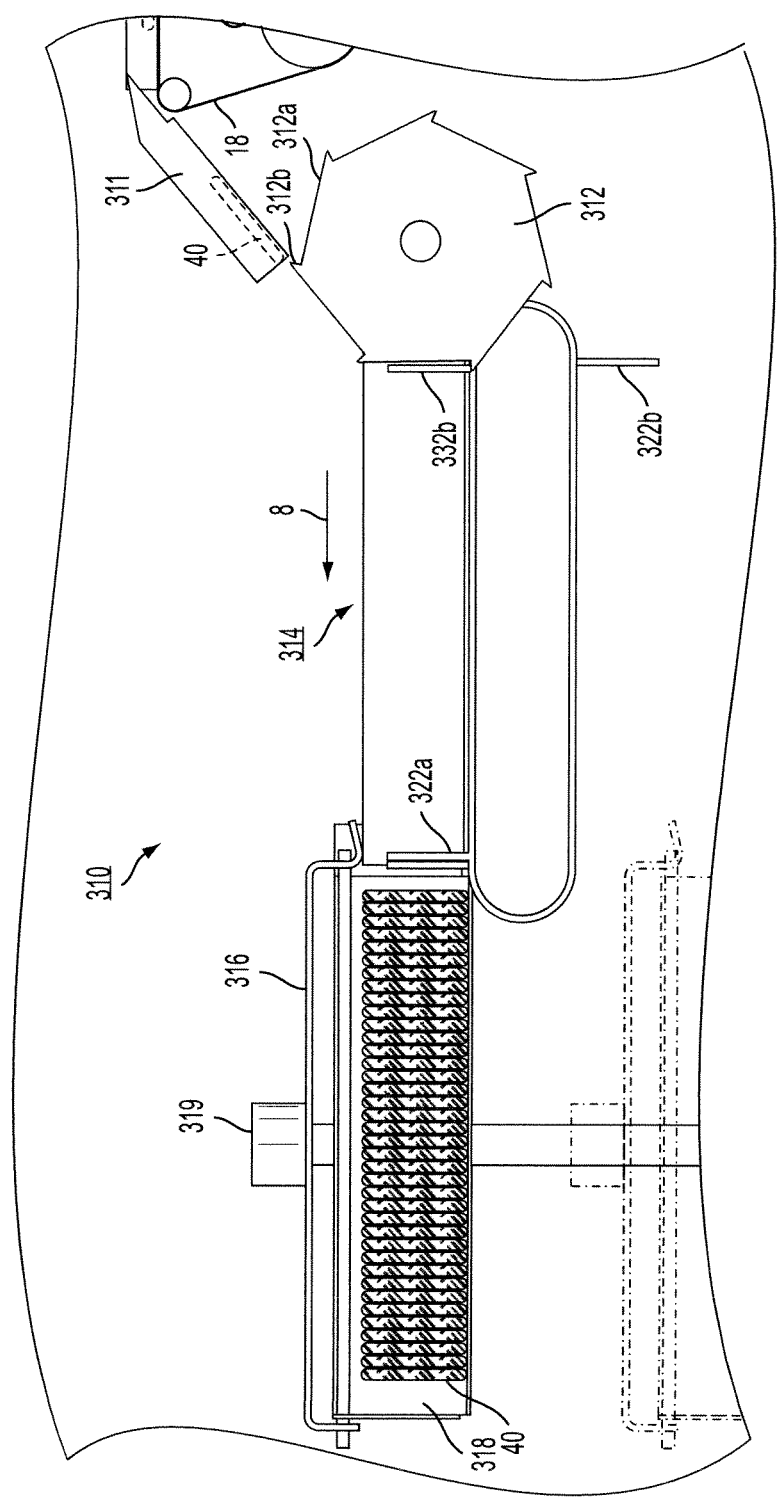

This process continues under control of the planner 4, where FIG. 12 illustrates an intermediate condition in which the leading lug 332a is positioned to maintain the first product 40 substantially vertical with the ramp 311 and the star wheel 312 reorienting and accumulating subsequent products 40 in the loader 314. As shown in FIG. 13, once a predetermined threshold slug weight and length have been achieved, the planner 4 uses either or both of the belts 322, 332 to push the gathered slug of products 40 to the interior chamber 318 of a transfer mechanism 316. The transfer mechanism 316 transfers the slug under control of the planner 4 to the output mechanism 50 by rotating the mechanism 316 about a pivot structure 319 and lowering the chamber 318 over the output mechanism belt 52. The transfer chamber 318 includes hinged side and lower support walls or unloading doors that are then opened at a scheduled time by the planner 4 to transfer the assembled slug as a group of vertically oriented products 40 (FIG. 9) to a predetermined section of the output mechanism belt 52, which then moves the slugs from multiple lanes 34 to a wrapping machine 60 (FIG. 14) under control of the planner 4.

In the illustrated embodiment, the planner 4 provides setpoint values and/or signals 6 to the end modules 310 to control the speed and position of the star wheel 312, the speed of the preceding belt module 10, the speed and position of the loader belts 320 and 330, the angular and height positions of the transfer mechanism chamber 318, and the hinged position of the unloading doors of the transfer mechanism 16, and further controls the speed and position of the output mechanism 50. The end modules 310 are thus operable to accumulate and orient two or more products 40 and to provide the gathered products 40 to the output mechanism 50 in a group.

Figure 14:
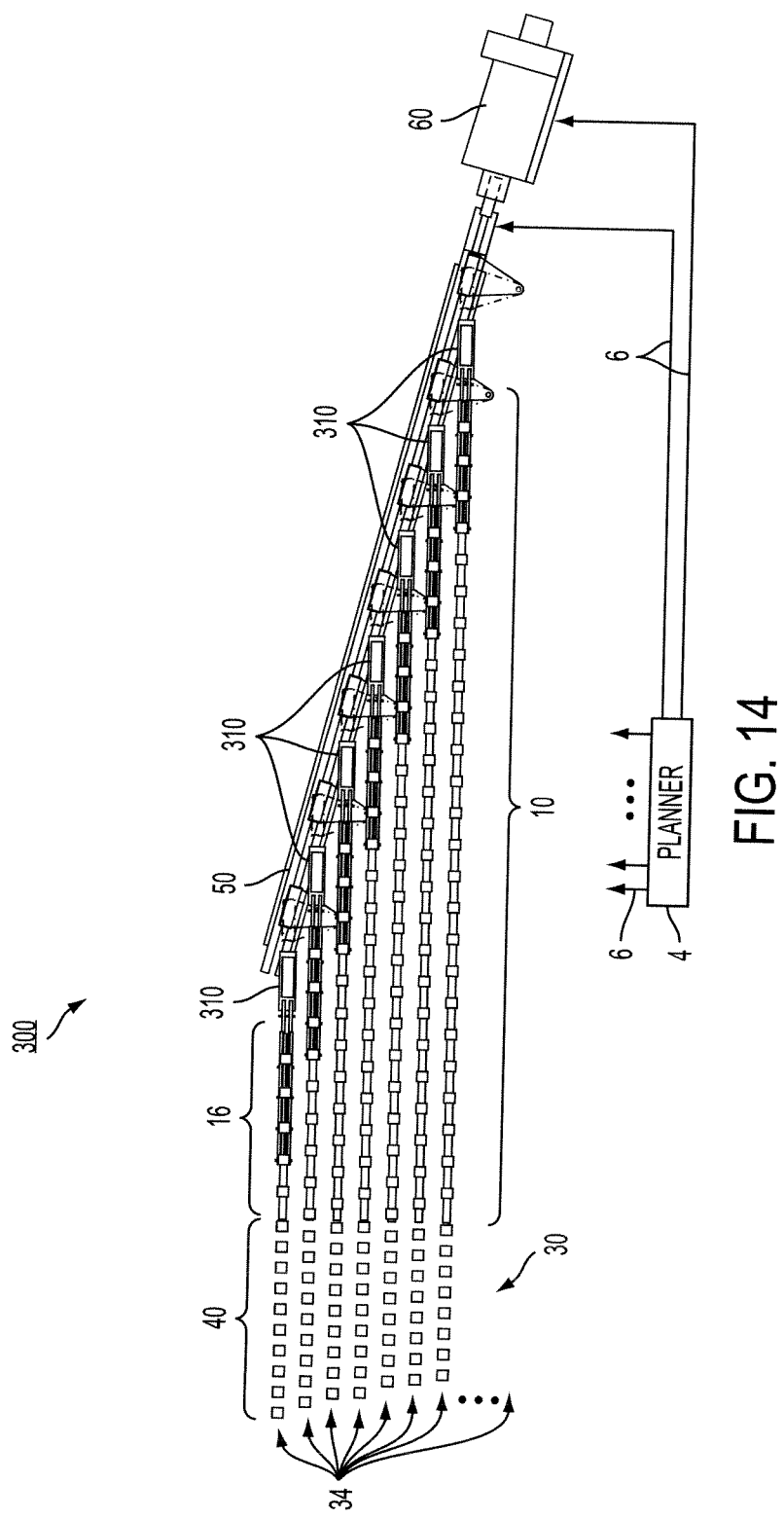

As shown in FIG. 14, one exemplary system 300 can be constructed as shown including a single planner 4 controlling and coordinating operation of an array of belt modules 10 and end modules 310 arranged in eight lanes 34, the output mechanism 50 and a wrapping machine 60 that wraps slugs of vertically oriented groups of products 40 into packages. The system 300 may be further extended to transport wrapped slugs by further modules 10 and output mechanism (not shown) to create a specified configuration of one or more wrapped slugs that are fed to a cartoning machine for assembling cartons of packages of products 40 using the above described planning and transporting concepts of the present disclosure.

The above examples are merely illustrative of several possible embodiments of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the disclosure. In addition, although a particular feature of the disclosure may have been disclosed with respect to only one of several embodiments, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising". It will be appreciated that various of the above-disclosed and other features and functions, or alternatives thereof, may be desirably combined into many other different systems or applications, and further that various presently unforeseen or unanticipated alternatives, modifications, variations or improvements therein may be subsequently made by those skilled in the art which are also intended to be encompassed by the following claims.

The invention claimed is:

1. An intelligent product feed system for transporting products along a process direction from an input transport mechanism to an output mechanism, the product feed system comprising:
   an array of transport modules formed into a plurality of columns with each column comprising one or more transport modules serially disposed along the process direction between the input transport mechanism and the output mechanism, at least some of the transport modules being variable speed transport modules, the individual variable speed transport modules comprising:
      a module transport mechanism operative to transport products along the process direction from a first end that receives products from a preceding module or from the input transport mechanism to a second end to provide the products to the subsequent module or to the output mechanism; and
      a speed control component operatively coupled with the module transport mechanism to control a speed at which a product is transported from the first end to the second end;
   a planner operatively coupled with the speed control component to generate a plan describing how the products are routed in the array and to operate the modules of a plurality of the columns according to the plan to transport groups of products delivered by the input transport mechanism to the array in uncertain fashion to the output mechanism synchronized and oriented according to a specified product configuration; and
   a model representing the feed system;
   wherein the planner updates the model if one or more modules fail or if one or more failed modules are repaired or replaced; and
   wherein the planner adapts the plan if one or more modules fail so as to continue transporting groups of products to the output mechanism synchronized and oriented according to the specified product configuration.

2. The product feed system of claim 1, wherein the output mechanism is an output transport mechanism that receives products from the array and transports products received from the array along a direction transverse to the process direction.

3. The product feed system of claim 1, wherein the output mechanism is an output transport mechanism that receives products from the array, and wherein the planner controls a speed of the output transport mechanism.

4. The product feed system of claim 1, wherein at least some of the individual modules include adjustable length module transport mechanisms with a length along the process direction between the first and second ends being adjustable, and wherein the planner is operative to adjust the length of at least one of the module transport mechanisms.

5. The product feed system of claim 1, wherein at least one of the modules is operative under control of the planner to accumulate and orient a plurality of products at the at least one module and to provide the gathered plurality of products to the output mechanism in a group.

6. The product feed system of claim 1, wherein the planner is operatively coupled to control the output mechanism and the array of transport modules in a coordinated fashion to transport products to the output mechanism synchronized and oriented according to the specified product configuration.

7. The product feed system of claim 1, wherein at least some of the transport modules include at least one sensor operative to detect a location of a product at the module transport mechanism.

8. The product feed system of claim 1, comprising:
a simulation component operative to simulate operation of the feed system, the input transport mechanism and the output mechanism using the model; and
a user interface including:
a visual representation of the simulated feed system, and
at least one user operable control allowing a user to modify the simulation.

9. The product feed system of claim 1, wherein the planner comprises:
an objectives component that defines at least one specified product configuration and one or more criteria on grading a quality of the plan describing how the products are routed in the array;
a constraints component that defines at least one constraint of at least one of the individual modules; and
a search component operative to generate a plan describing setpoint values for at least some of the modules to achieve the specified product configuration objective according to all constraints and the detected locations of products at the individual transport modules, and to provide setpoint inputs directly or indirectly to the individual transport modules according to the plan.

10. The product feed system of claim 9, wherein the search component provides at least one of time setpoints representing times when products are to arrive at the modules, and speed setpoints representing the desired module transport mechanism speeds with acceleration/deceleration specifications for the modules according to the plan.

11. The product feed system of claim 9, wherein the search component performs a heuristic search to generate the plan.

12. The product feed system of claim 1, further comprising at least one control component operatively coupled with the planner and with at least one of the modules, the control component operative to provide a control input to the module based at least partially on a plan generated by the planner.

13. The product feed system of claim 12, wherein the control component is operative to provide product location information to the planner based at least partially on sensor information from the module.

14. The product feed system of claim 1, wherein at least one of the modules is operative under control of the planner to reorient products while transporting the products along the process direction.

15. The product feed system of claim 14, wherein the at least one module includes a rotating structure to facilitate reorienting products from substantially horizontal to substantially vertical.

16. The product feed system of claim 14, wherein at least one of the modules is operative under control of the planner to accumulate and orient a plurality of products at the at least one module and to provide the gathered plurality of products to the output mechanism in a group.

17. An intelligent product feed system for transporting products along a process direction from an input transport mechanism to an output mechanism, the product feed system comprising:
an array of transport modules formed into a plurality of columns with each column comprising one or more transport modules serially disposed along the process direction between the input transport mechanism and the output mechanism, at least some of the transport modules being variable speed transport modules, the individual variable speed transport modules comprising:
a module transport mechanism operative to transport products along the process direction from a first end that receives products from a preceding module or from the input transport mechanism to a second end to provide the products to the subsequent module or to the output mechanism: and
a speed control component operatively coupled with the module transport mechanism to control a speed at which a product is transported from the first end to the second end:
a planner operatively coupled with the speed control component to generate a plan describing how the products are routed in the array and to operate the modules of a plurality of the columns according to the plan to transport groups of products delivered by the input transport mechanism to the array in uncertain fashion to the output mechanism synchronized and oriented according to a specified product configuration; and
a model representing the feed system:
wherein the planner adapts the plan if one or more failed modules are repaired or replaced and are online again so as to continue transporting groups of products to the output mechanism synchronized and oriented according to the specified product configuration.

18. The product feed system of claim 17, comprising:
a simulation component operative to simulate operation of the feed system, the input transport mechanism and the output mechanism using the model; and
a user interface including:
a visual representation of the simulated feed system, and
at least one user operable control allowing a user to modify the simulation.

19. A method of transporting products received in uncertain fashion from an input transport mechanism to an output mechanism synchronized and oriented according to a specified product configuration, the method comprising:
providing at least one transport objective that defines at least one specified product configuration;
providing at least one constraint that defines at least one constraint of one or more individual modules of an array formed into a plurality of columns comprising a plurality of transport modules, with each column comprising one or more transport modules serially disposed along the process direction between the input transport mechanism and the output mechanism;
receiving products from the input transport mechanism in the array;
detecting locations of products at the transport modules;
generating a plan describing setpoint values for at least some of the modules to achieve the specified product configuration objective according to the specified constraints and the detected product locations;
providing one or more criteria on grading a quality of the plan;
providing setpoint inputs directly or indirectly to at least some of the individual transport modules to individually control the module speeds to transport products to the output mechanism synchronized and oriented according to a specified product configuration according to the plan; and
simulating operation of the array according to the plan, the input transport mechanism, and the output mechanism using a model representing the array.

20. The method of claim 19, further comprising controlling a speed of the output transport mechanism according to the plan.

21. The method of claim 19, further comprising selectively adjusting a length of at least one of the module transport modules.

22. The method of claim 19, further comprising adapting the plan if one or more modules fail so as to continue transporting groups of products to the output mechanism synchronized and oriented according to the specified product configuration.

23. The method of claim 19, further comprising updating a model representing the array if one or more modules fail or if one or more failed modules are repaired/replaced and are online again.

24. The method of claim 19, further comprising:
   providing a visual representation of the simulation; and
   allowing a user to modify the simulation using at least one user interface control.

25. The method of claim 19, further comprising providing at least one control component to provide a control input to the module based at least partially on the plan.

26. The method of claim 19, further comprising reorienting products while transporting the products along the process direction.

27. The method of claim 19, further comprising accumulating and orienting a plurality of products at one of the modules; and providing the accumulated and oriented plurality of products to the output mechanism in a group synchronized and oriented according to a specified product configuration according to the plan.

* * * * *